US011346959B2

(12) United States Patent
Zheng et al.

(10) Patent No.: US 11,346,959 B2
(45) Date of Patent: May 31, 2022

(54) METHOD AND APPARATUS TO DETERMINE RELATIVE LOCATION USING GNSS CARRIER PHASE

(71) Applicant: QUALCOMM Incorporated, San Diego, CA (US)

(72) Inventors: Bo Zheng, Sunnyvale, CA (US); Yinghua Yang, San Jose, CA (US); Ning Luo, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 16/797,350

(22) Filed: Feb. 21, 2020

(65) Prior Publication Data

US 2021/0263165 A1 Aug. 26, 2021

(51) Int. Cl.
| | |
|---|---|
| *G01S 19/44* | (2010.01) |
| *G01S 19/04* | (2010.01) |
| *H04W 4/46* | (2018.01) |
| *G01S 19/24* | (2010.01) |
| *G01S 19/51* | (2010.01) |
| *H04W 4/02* | (2018.01) |

(52) U.S. Cl.
CPC .............. *G01S 19/44* (2013.01); *G01S 19/04* (2013.01); *G01S 19/243* (2013.01); *G01S 19/51* (2013.01); *H04W 4/023* (2013.01); *H04W 4/46* (2018.02)

(58) Field of Classification Search
CPC ........ G01S 19/44; G01S 19/04; G01S 19/243; G01S 19/51; H04W 4/46; H04W 4/023

USPC ..................................................... 342/357.27
See application file for complete search history.

(56) References Cited

U.S. PATENT DOCUMENTS

| 11,221,419 B1* | 1/2022 | Phan ....................... G01S 19/44 |
| 2009/0140916 A1 | 6/2009 | Shamoto |
| 2012/0290146 A1* | 11/2012 | Dedes ................ G01C 21/3697 |
| | | 701/1 |

(Continued)

FOREIGN PATENT DOCUMENTS

| EP | 3518210 A1 | 7/2019 |
| EP | 3859709 A1 * | 8/2021 |

(Continued)

OTHER PUBLICATIONS

Frohle M., et al., "Cooperative Localization of Vehicles Without Inter-Vehicle Measurements", 2018 IEEE Wireless Communications and Networking Conference (WCNC), IEEE, Apr. 15, 2018 (Apr. 15, 2018), 6 Pages, XP033355042, DOI: 10.1109/WCNC. 2018.8377047 [retrieved on Jun. 8, 2018] the whole document.

(Continued)

*Primary Examiner* — Harry K Liu

(57) ABSTRACT

Techniques are provided which may be implemented using various methods and/or apparatuses in a vehicle to determine proximate vehicles, for example, vehicles within a pre-designated range or within broadcast distance or otherwise geographically proximate, through the use of broadcast or other messages sent by the other vehicles, and to obtain GNSS carrier phase measurement data from the proximate vehicles wherein the shared carrier GNSS phase measurement data may be utilized to update the location(s) of proximate vehicles.

30 Claims, 17 Drawing Sheets

(56) References Cited

U.S. PATENT DOCUMENTS

| | | | | |
|---|---|---|---|---|
| 2015/0046078 A1* | 2/2015 | Biess | ............... | G08G 1/163 |
| | | | | 701/301 |
| 2017/0213459 A1 | 7/2017 | Ogaz | | |
| 2019/0208387 A1* | 7/2019 | Jiang | ............... | H04W 72/044 |
| 2020/0092694 A1* | 3/2020 | Chen | ............... | H04L 67/22 |
| 2020/0280398 A1* | 9/2020 | Hwang | ............... | H04L 1/1819 |
| 2021/0250173 A1* | 8/2021 | Obiagwu | ............... | G07C 5/008 |
| 2021/0263165 A1 | 8/2021 | Zheng et al. | | |
| 2021/0263166 A1 | 8/2021 | Zheng et al. | | |

FOREIGN PATENT DOCUMENTS

| | | | | |
|---|---|---|---|---|
| JP | 2016169974 A | 9/2016 | | |
| RU | 2690521 C1 | 6/2019 | | |
| WO | WO-2020141220 A1 * | 7/2020 | ........... | G08G 1/0145 |

OTHER PUBLICATIONS

International Search Report and Written Opinion—PCT/US2021/018331—ISA/EPO—dated Jan. 5, 2022.

\* cited by examiner

METHOD AND APPARATUS TO DETERMINE RELATIVE LOCATION USING GNSS CARRIER PHASE

BACKGROUND

1. Field

The subject matter disclosed herein relates to automotive devices and vehicles, and more particularly to methods, messaging and apparatuses for use in or with a vehicle to determine relative location using Global Navigation Satellite System (GNSS) carrier phase from other vehicles.

2. Information

Autonomous or partially autonomous cars require accurate, prompt locations of surrounding vehicles to enable automated driving and to enhance the safety, efficiency and convenience of vehicular transportation. For example, path and maneuver planning for a vehicle to everything (V2X)-capable vehicle (such as, for example, a cellular vehicle to everything-capable vehicle (CV2X), here referred to as the vehicle, depends on knowing the accurate inter-vehicle distances and relative locations. The capabilities and behavior of surrounding vehicles helps determine, for example, safe intervehicle spacing and lane change maneuvering. The location and location-related measurements of surrounding vehicles will need to be communicated, for example, through V2X application-layer standards via a set of Data elements (DEs) for vehicles to exchange capability information. However, the capability and method of determining location for each vehicle may vary based on model, brand and other factors. Furthermore, when using a global navigation satellite system (GNSS) for location, GNSS signals may be subject to various error factors such as multipath, ionospheric errors and tropospheric errors that may impact the accuracy of the absolute location, as may be shared by each vehicle. Given, however, that one prime objective of each vehicle is to avoid collision and to maintain safe distances in respect to other vehicles, availability of data for relative location (distance and direction between vehicles) may be more useful, in some situations, versus absolute location (latitude/longitude) particularly when the absolute location is subject to significant error from outside factors such as dense urban reflection of GNSS signals. Therefore, adding V2X data elements to enable calculation of relative distance may enable vehicles to optimize times and distances for safe inter-vehicle spacing and maneuvers.

SUMMARY

Some example techniques are presented herein which may be implemented in various methods and apparatuses in a vehicle to determine, send, receive and utilize location and GNSS location measurement data to determine inter-vehicle spacing, intersection priority, lane change behavior and spacing and other autonomous vehicle behavior.

In an embodiment, a method of updating a location of target vehicles using GNSS phase measurement data may comprise: determining a location of an ego vehicle; receiving, at the ego vehicle from a first proximate vehicle, a broadcast message comprising a first location of the first proximate vehicle and a vehicle ID of the first proximate vehicle; determining, based at least in part upon a distance between the location of the ego vehicle and the first location of the first proximate vehicle, that the first proximate vehicle is within a threshold range from the ego vehicle; obtaining GNSS phase measurement data for the first proximate vehicle; determining GNSS phase measurement data for the ego vehicle; determining a second location of the first proximate vehicle based, at least in part, upon the GNSS phase measurement data for the first proximate vehicle and the GNSS phase measurement data for the ego vehicle.

In an embodiment a vehicle, may comprise: a wireless transceiver; a GNSS receiver; a memory; and one or more processors, communicatively coupled to the wireless transceiver, the GNSS receiver and the memory; wherein the one or more processors are configured to: determine a location of an ego vehicle; receive a broadcast message, at the ego vehicle, comprising a first location of a first proximate vehicle and a vehicle ID of the first proximate vehicle from the first proximate vehicle; determine, based at least in part upon a distance between the location of the ego vehicle and the first location of the first proximate vehicle, that the first proximate vehicle is within a threshold range from the ego vehicle; obtain GNSS phase measurement data for the first proximate vehicle; determine GNSS phase measurement data for the ego vehicle; determine a second location of the first proximate vehicle based, at least in part, upon the GNSS phase measurement data for the first proximate vehicle and the GNSS phase measurement data for the ego vehicle.

In an embodiment, a vehicle may comprise: means for determining a location of an ego vehicle; means for receiving a broadcast message, at the ego vehicle, comprising a first location of a first proximate vehicle and a vehicle ID of the first proximate vehicle from the first proximate vehicle; means for determining, based at least in part upon a distance between the location of the ego vehicle and the first location of the first proximate vehicle, that the first proximate vehicle is within a threshold range from the ego vehicle; means for obtaining GNSS phase measurement data for the first proximate vehicle; means for determining GNSS phase measurement data for the ego vehicle; means for determining a second location of the first proximate vehicle based, at least in part, upon the GNSS phase measurement data for the first proximate vehicle and the GNSS phase measurement data for the ego vehicle.

In an embodiment, a non-transitory computer-readable medium may have stored thereon computer-readable instructions to cause one or more processors on a vehicle to: determine a location of an ego vehicle; receive a broadcast message, at the ego vehicle, comprising a first location of a first proximate vehicle and a vehicle ID of the first proximate vehicle from the first proximate vehicle; determine, based at least in part upon a distance between the location of the ego vehicle and the first location of the first proximate vehicle, that the first proximate vehicle is within a threshold range from the ego vehicle; obtain GNSS phase measurement data for the first proximate vehicle; determine GNSS phase measurement data for the ego vehicle; determine a second location of the first proximate vehicle based, at least in part, upon the GNSS phase measurement data for the first proximate vehicle and the GNSS phase measurement data for the ego vehicle.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
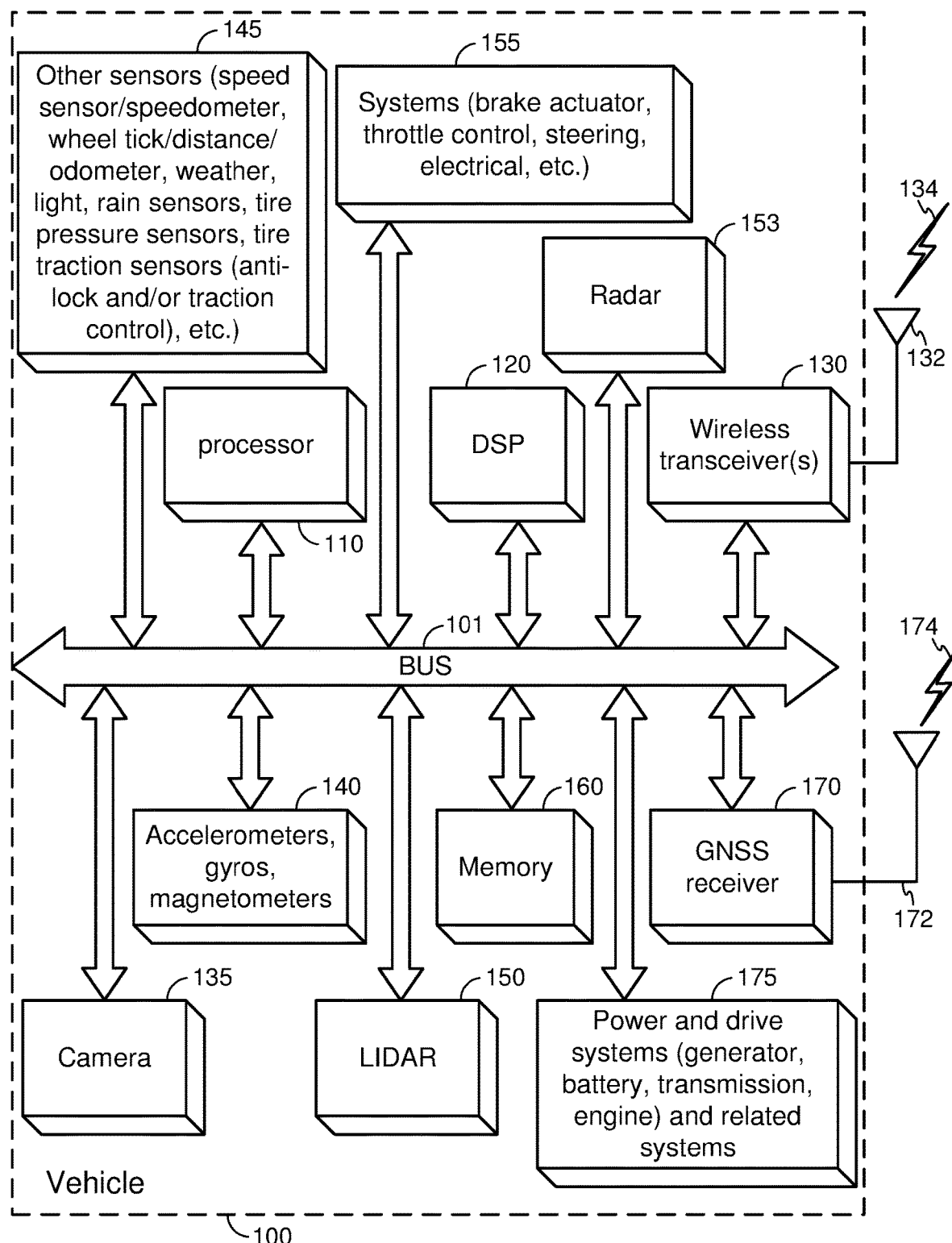
FIG. 1 illustrates a block diagram of various components and/or systems implemented in an exemplary vehicle.

Some example techniques are presented herein which may be implemented in various methods, means and apparatuses in a vehicle. Example techniques presented herein address various methods and apparatuses in a vehicle to provide for or otherwise support the determination and use of vehicle to everything (V2X) data elements to determine relative location. Example techniques described herein may generally apply to the V2X capability data elements (DEs) describing V2X-enabled vehicle capabilities, not currently defined in V2X application-layer standards, including global navigation satellite system (GNSS) measurement information, demodulated GNSS information and/or other GNSS-related information as will be discussed herein. These DEs can be provided via V2X messages, for example, such as those defined in the Surface Vehicle Standard (SVS) from the Society of Automotive Engineers (SAE) or and those defined in the Intelligent Transport System (ITS) standards from the European Telecommunications Standards Institute (ETSI), and utilized for relative positioning between vehicles. Example techniques and embodiments are provided for determining and providing these data elements. In an embodiment, the vehicle is able to dynamically update or adjust the value of the GNSS measurement data elements using vehicle GNSS receiver data and using external V2X inputs, such as data elements from other vehicles, to determine vehicle to vehicle or vehicle to roadside unit or vehicle to other device relative location as well as to provide up to date data elements over the air (OTA) to nearby vehicles or devices.

Where accurate relative position of nearby vehicles is known, it may be used to enhance safety by increasing the accuracy and reducing uncertainty relative to inter-vehicle spacing, lane changes and maneuvers in the presence of other vehicles, thus avoiding collisions. Accurate positioning of the proximal cars (e.g., in front of the vehicle, in back of the vehicle, and on either side of the vehicle, if present) thus increases safety and prevents accidents. Relative positioning may be determined through various means such as LIDAR, RADAR and camera. However, LIDAR is expensive and possibly subject to inclement weather blockage, camera while in more widespread use, is similarly subject to inclement weather blockage, and RADAR tends to be forward facing and subject to blockage. Relative positioning using GNSS-based carrier phase observations may be done quickly and inexpensively and may be utilized to verify, complement and, in some cases replace some of the aforementioned systems. This is particularly attractive as GNSS receivers are widely installed in vehicles for navigation purposes and can therefore be very cost-effectively utilized for relative positioning through the addition of GNSS-based carrier phase differencing technology (both to share/communicate GNSS-based carrier phase information and to determine relative positioning solutions between vehicles).

GNSS-based location is subject to various factors such as multipath error, ionospheric error, and tropospheric error. Therefore, an absolute location, based on GNSS, will typically have some associated uncertainty and/or error associated with it, particularly in dense urban or other high blockage areas. A GNSS-based absolute location may be verified and/or corrected using other technologies such as dead reckoning information from distance sensors (wheel ticks, etc.), accelerometer and gyro measurements, camera information, SONAR, RADAR and/or LIDAR or other both absolute and relative positioning technologies, possibly used in conjunction with points of reference such as landmarks or roadside units. Some of these measurements systems such as LIDAR, RADAR and SONAR systems may be expensive to implement and may not be present on every vehicle model. Some legacy vehicles may also not have some of the redundant location determination technologies.

GNSS-based carrier phase observations, however, may be used to determine very accurate relative positions between two receiving antennas. In some embodiments, accuracy may be at the centimeter (cm) level. This is particularly true, where the two antennas are relatively close and therefore subject to the same multi-path and other error effects (such as ionospheric and tropospheric delays), where the error effects may be calculated out/minimized by the use of two or more measurements. In this case, the two receiving antennas, for example located on adjacent or otherwise closely located cars, will experience some of the same error effects such that those error effects may be cancelled out in calculating the relative location of the two antennas (and therefore of the two cars).

The carrier phase measurement may be very precise; however, it can contain very large errors as illustrated by a review of the components contributing to carrier phase. However, many if not most of these errors will be shared by two near-adjacent antennas. Carrier phase may be represented by the following formula, where $\varnothing_\alpha^j(t)$ represents carrier phase variation measurements between antenna α and satellite j (in meters) at time t. $\emptyset_{initial}^j$ is the transmitted carrier phase from the satellite vehicle (SV j). $\lambda$ is the wavelength corresponding to the frequency of the band transmission. $N_\alpha^j$ is integer carrier phase ambiguity between antenna $\alpha$ and satellite j. $\varepsilon(\emptyset)$ is carrier phase measurement error due to noise and carrier phase multipath, $d_{mpc}^j$. $\rho_\alpha^j(t)$ is the geometric range from antenna $\alpha$ to satellite j at time t. $dt^j$ is SV j clock error. $dT_\alpha$ is receiver $\alpha$ clock error. $d_{orbit}^j$ is SV j orbital error. $d_{ion}^j$ is ionospheric delay (multiplied by c, the speed of light, to convert to distance). $d_{trop}^j$ is tropospheric delay (multiplied by c, the speed of light, to convert to distance).

$$\emptyset_\alpha^j(t) = \rho_\alpha^j(t) - \lambda N_\alpha^j - c \cdot (dt^j + dT_\alpha) + \emptyset_{initial}^j + c \cdot d_{orbit}^j + c \cdot d_{ion}^j - c \cdot d_{trop}^j + \varepsilon(\emptyset)$$

Double difference may be used to reduce the impact of the above-mentioned error sources on carrier phase measurements. In an embodiment, a carrier phase single difference may be determined by differencing the carrier phase measurement taken at a first vehicle with the carrier phase measurement taken from a second vehicle. The spatially common errors (i.e., those errors associated with the approximate location of both the first and second vehicles, assuming there are reasonably close to each other, such as satellite clock error, satellite orbital error, tropospheric error, and ionospheric error), may be removed or greatly reduced. A carrier phase double difference may be determined by differencing the single differenced carrier phase measurement for the first satellite with a single differenced carrier phase measurement for a second satellite. The double difference will enable errors common to a receiver (such as receiver clock bias) to be cancelled. This two step differencing process is referred to as a double difference, $\Delta\nabla\phi$, and will enable resolution of carrier phase integer ambiguity and henceforth enable centimeter level positioning accuracy.

Figure 17:
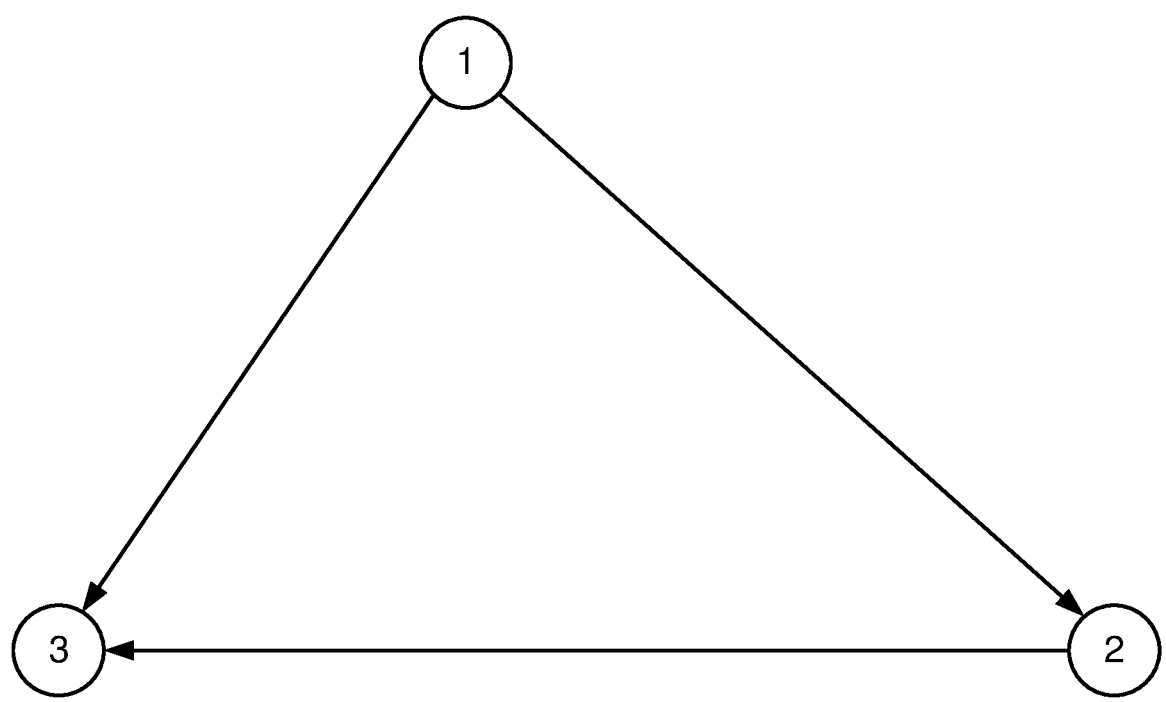
FIG. 17 illustrates vectors between three receivers.

If we introduce a third GNSS receiver (thus, having receivers 1, 2 and 3), as illustrated in FIG. 17, taking carrier phase measurements, we can further constrain ambiguity. With three GNSS receivers, we can determine three baselines between any two receivers, i.e., $\Delta\nabla\phi_{1,2}^{i,j}$, $\Delta\nabla\phi_{1,3}^{i,j}$, $\Delta\nabla\phi_{2,3}^{i,j}$, and hence, three corresponding double difference ambiguities. The ambiguity constrained according to the following, $\Delta\nabla N_{1,2}^{i,j} + \Delta\nabla N_{2,3}^{i,j} = \Delta\nabla N_{1,3}^{i,j}$, which may be utilized for integer ambiguity resolution thereby reducing the time of resolution and increasing reliability. Similarly, if the measurements from the three GNSS receivers are processed together, we can form three position vectors between the three receivers (1, 2, and 3), $\vec{P}_{1,2}$, $\vec{P}_{2,3}$, $\vec{P}_{1,3}$, where $\vec{P}_{1,2} + \vec{P}_{2,3} = \vec{P}_{1,3}$. This vector relationship is clearly illustrated in FIG. 17. The position vector constraint may be used to accelerate baseline/ambiguity resolution and to improve reliability.

With the advent of 5G V2X (5$^{th}$ generation radio connecting cars to everything; V2X stands for vehicle to everything) technology, V2X-enabled vehicles will be connected to each other, enabling the sharing of information such as status, capabilities and measurement data with low latency. Vehicles may share, in an embodiment, GNSS pseudorange and carrier phase measurements as well as, in an embodiment, location information. For example, vehicles may send GNSS pseudorange and/or carrier phase measurements as well as, in some embodiments, other GNSS information from vehicle to vehicle, or broadcast from each vehicle to nearby vehicles or some combination thereof.

As discussed above, the exchange of GNSS pseudorange and carrier phase information greatly enhances the accuracy of vehicle to vehicle distance and vector determination. This information could be broadcast to vehicles within reception range or transferred vehicle to vehicle (point to point), perhaps in response to receipt of a capabilities broadcast, or could utilize a combination of the broadcast and vehicle to vehicle information to reduce messaging overhead. For example, in an embodiment, location may be broadcast to vehicles in reception range where GNSS measurement information may be requested by vehicles that meet a proximity constraint based upon the broadcast position of a target vehicle. In an embodiment, a request may trigger successive GNSS measurement transfers subject to termination based on moving past a distance threshold and/or subject to re-request past a time threshold and/or maintained transfers as long as broadcast messaging signal strength is greater than a threshold signal strength. By using double differenced ranging between vehicles, ranging may, depending on the circumstances, be determined with cm level accuracy.

In an embodiment the messaging elements and/or content sent be similar to the following. The messages may comprise both vehicle-specific but satellite independent variables, as illustrated in Table 1, and satellite dependent variables, as illustrated in Table 2, whereby the variables of Table 2 may be transmitted for each visible satellite (for a given vehicle) or some subset thereof. In an embodiment, criteria such as signal strength or measures of multipath may also be used to select the satellites with the strongest signals or the least multipath to use in double differencing calculations between vehicles. Similarly, vehicles may, in an embodiment, request GNSS measurement information generally or with specificity (for example, as to which satellites).

TABLE 1

GNSS Measurements API, common data

| Contents | Notes |
| --- | --- |
| Vehicle ID | |
| Vehicle position | e.g., latitude (degrees), longitude (degrees), altitude (meters, optional) |
| Vehicle horizontal position uncertainty (optional) | Units: meters |
| Vehicle vertical position uncertainty (optional) | Units: meters |
| Measurement time - gpsWeek | Current GPS week as calculated from midnight, Jan. 6, 1980. Units: Weeks. |
| Measurement time - gpsTimeOfWeekMs | Amount of time into the current GPS week, units: milliseconds |
| Number of valid GNSS measurements | |

TABLE 2

GNSS Measurements API, per satellite vehicle (SV) data

| Contents | Notes |
| --- | --- |
| Satellite vehicle (SV) ID | PRN number for each SV |
| GLONASS frequency number | Frequency number, for GLONASS SVs only |
| GNSS signal type | GNSS signal constellation, carrier frequency, and channel type (e.g., L1, L2, or L5 for GPS) |
| Carrier phase | Carrier phase measurement (cycle) |
| Pseudo-range | Pseudo-range measurement (m) |
| C/N$_o$ | Carrier-to-noise ratio. Units: dB-Hz |
| Loss-of-lock | Loss of lock indicator |

Some of the benefits of GNSS-based relative positioning include low cost and leverage of the pre-existing GNSS receiver, high accuracy in open sky environments such as highways, all weather operation (not blinded by rain or snow), operation even at a distance, operation even out of sight (far away, around a corner, blocked by an object or objects or by one or more vehicles), and no inherent interference (GNSS receivers are passive so GNSS measurements do not interfere with other transmissions and/or measurements, as opposed to RADAR, for example). Also, highly accurate GNSS carrier phase-based relative positioning may be used either alone or in combination with other technologies such as RADAR, LIDAR and camera, which can improve positioning robustness and redundancy. GNSS carrier phase-based relative positioning, particularly in clear sky highway conditions, may be used to calibrate the other systems such as RADAR, LIDAR and camera systems, using GNSS carrier phase-based relative positioning to determine a relative position to a remote object to determine truth for calibration for the camera, RADAR or LIDAR. This can be particularly useful in correcting for alignment issues such as may occur if a bumper-integrated camera or radar unit is impacted and pushed out of alignment. Similarly, if GNSS carrier phase-based relative positions may also be utilized to calibrate distance estimates for RADAR, LIDAR and camera systems.

In an embodiment, some or all of the GNSS measurements information from Table 1 and Table 2 may be sent as V2X data elements. In an embodiment, V2X data elements (DEs) describing the GNSS measurements and data, such as decoded GNSS satellite identification information and/or time information and/or other information as noted in Tables 1 and 2 above may be sent, including global navigation satellite system (GNSS) measurement information, demodulated GNSS information and/or other GNSS-related information. These data elements (DE) can be provided via V2X messages, for example, such as those defined in the Surface Vehicle Standard (SVS) from the Society of Automotive Engineers (SAE) or and those defined in the Intelligent Transport System (ITS) standards from the European Telecommunications Standards Institute (ETSI). In an embodiment, the shared GNSS information, such as that contained in the above-mentioned data elements, may be and utilized for relative positioning between vehicles and/or for vehicle control and maneuvering.

Figure 2:
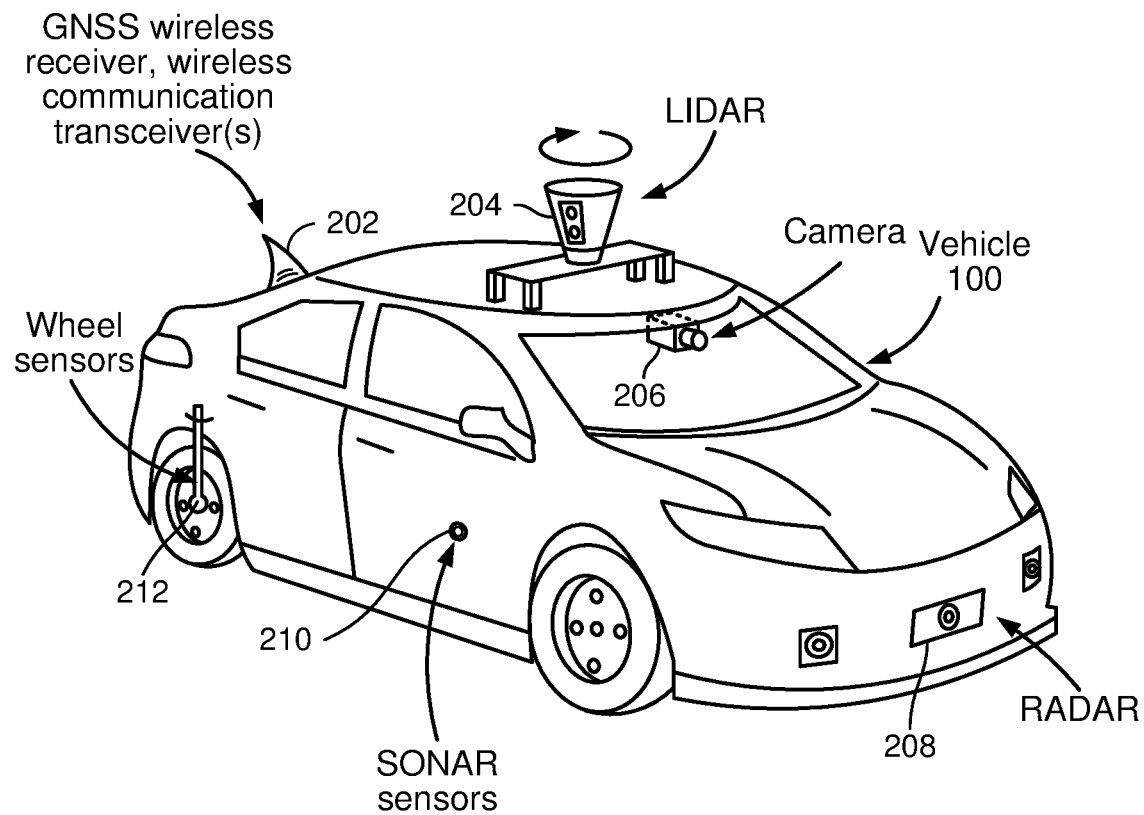
FIG. 2 illustrates a view of an exemplary vehicle configured with various sensor and communications components and/or systems.

In an embodiment, the data elements may be determined using GNSS receiver 170, of FIG. 1, for example, as may be located in the shark fin 202 of vehicle 100, of FIG. 2, or elsewhere in the vehicle. The GNSS receiver and processing, in an embodiment, may be part of the vehicle external sensors 302, of FIG. 3, or signal information from GNSS receiver 170 may be processed in DSP 120 or in processor 110 or a combination thereof. The received GNSS data may be stored and/or processed in memory 160 in the vehicle, such as non-volatile RAM/ROM or hard drive and shared via wireless transceiver(s) 130. In an embodiment, the GNSS data may be broadcast or sent point to point to other vehicles.

As shown in FIG. 1, in an embodiment, vehicle 100, for example, a car, truck, motorcycle and/or other motorized vehicle, may transmit radio signals to, and receive radio signals from, other vehicles 100, for example, via V2X car to car communication (for example, using one of the CV2X vehicle to vehicle communication protocols), and/or from a wireless communication network 470, in an embodiment, via wide area network (WAN) base station (BTS) and/or wireless access point 430, and/or from a roadside unit (RSU or roadside device) 425. In one example, vehicle 100 (e.g., vehicle 480) may communicate, via wireless transceiver(s) 130 and wireless antenna(s) 132 with other vehicles (e.g., vehicle 490) and/or wireless communication networks by transmitting wireless signals to, or receiving wireless signals from a remote wireless transceiver which may comprise another vehicle 490, a wireless base transceiver subsystem (BTS) 420, e.g., a Node B or an evolved NodeB (eNodeB) or a next generation NodeB (gNodeB), or wireless access point 430, over a wireless communication link.

Similarly, vehicle 100 may transmit wireless signals to, or receive wireless signals from a local transceiver over a wireless communication link, for example, by using a wireless local area network (WLAN) and/or a personal area network (PAN) wireless transceiver, here represented by one of wireless transceiver(s) 130 and wireless antenna(s) 132. In an embodiment, wireless transceiver(s) 130 may comprise various combinations of WAN, WLAN and/or PAN transceivers. In an embodiment, a local transceiver may also be a Bluetooth transceiver, a ZigBee transceiver, or other PAN transceiver. In an embodiment, vehicle 100 may transmit wireless signals to, or receive wireless signals from a wireless transceiver 130 on a vehicle 100 over wireless communication link 134. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver 130 may be located on various vehicles 100 boats, ferries, cars, buses, drone and various transport vehicles. In an embodiment, the vehicle 100 may be utilized for passenger transport, package transport or other purposes. In an embodiment, GNSS signals 174 from GNSS Satellites are utilized by vehicle 100 for location determination and/or for the determination of GNSS signal parameters and demodulated data. In an embodiment, signals 134 from WAN transceiver(s), WLAN and/or PAN local transceivers are used for location determination, alone or in combination with GNSS signals 174.

Examples of network technologies that may support wireless transceivers 130 are Global System for Mobile Communications (GSM), Code Division Multiple Access (CDMA), Wideband CDMA (WCDMA), Long Term Evolution LTE), $5^{th}$ Generation Wireless (5G) or New Radio Access Technology (NR), High Rate Packet Data (HRPD), and V2X car to car communication. V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB.

Wireless transceivers 130 may communicate with communications networks via WAN wireless base stations which may comprise deployments of equipment providing subscriber access to a wireless telecommunication network for a service (e.g., under a service contract). Here, a WAN wireless base station may perform functions of a wide area network (WAN) or cell base station in servicing subscriber devices within a cell determined based, at least in part, on a range at which the WAN wireless base station is capable of providing access service. Examples of WAN base stations include GSM, WCDMA, LTE, CDMA, HRPD, WiFi, BT, WiMax, and/or $5^{th}$ Generation (5G) NR base stations. In an embodiment, further wireless base stations may comprise a wireless LAN (WLAN) and/or PAN transceiver.

In an embodiment, vehicle 100 may contain multiple wireless transceivers including WAN, WLAN and/or PAN transceivers. In an embodiment, radio technologies that may support wireless communication link or links further comprise Wireless local area network (e.g., WLAN, e.g., IEEE 802.11), Bluetooth (BT) and/or ZigBee.

In an embodiment, vehicle 100 may contain one or more cameras 135. In an embodiment, the camera may comprise a camera sensor and mounting assembly. Different mounting assemblies may be used for different cameras on vehicle 100. For example, front facing cameras may be mounted in the front bumper, in the stem of the rear-view mirror assembly or in other front facing areas of the vehicle 100. Rear facing cameras may be mounted in the rear bumper/fender, on the rear windshield, on the trunk or other rear facing areas of the vehicle. The side facing mirrors maybe mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modifying accordingly to update estimated parameters based on camera and other sensor measurements).

Accelerometers, gyros and magnetometers 140, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as potholes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 145 such as speed sensors, wheel tick sensors, and/or odometer measurements.

The light detection and ranging (LIDAR) 150 subsystem uses pulsed laser light to measure ranges to objects. While cameras may be used for object detection, LIDAR 150 provides a means, to detect the distances (and orientations) of the objects with more certainty, especially in regard to objects of unknown size and shape. LIDAR 150 measurements may also be used to estimate rate of travel, vector directions, relative position and stopping distance by providing accurate distance measurements and delta distance measurements.

Memory 160 may be utilized with processor 110 and/or DSP 120. which may comprise FLASH, RAM, ROM, disc drive, or FLASH card or other memory devices or various combinations thereof. In an embodiment, memory 160 may contain instructions to implement various methods described throughout this description including, for example, processes to implement the use of relative positioning between vehicles and between vehicles and external reference objects such as roadside units. In an embodiment, memory may contain instructions for operating and calibrating sensors, and for receiving map, weather, vehicular (both vehicle 100 and surrounding vehicles) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 175 and systems (brake, actuator, throttle control, steering, and electrical) 155 may be controlled by the processor(s) and/or hardware or software or by an operator of the vehicle or by some combination thereof. The systems (brake, actuator, throttle control, steering, electrical, etc.) 155 and power and drive or other systems 175 may be utilized in conjunction with performance parameters and operational parameters, to enable autonomously (and manually, relative to alerts and emergency overrides/braking/stopping) driving and operating a vehicle 100 safely and accurately, such as to safely, effectively and efficiently merge into traffic, stop, accelerate and otherwise operate the vehicle 100. In an embodiment, input from the various sensor systems such as camera 135, accelerometers, gyros and magnetometers 140, LIDAR 150, GNSS receiver 170, RADAR 153, input, messaging and/or measurements from wireless transceiver(s) 130 and/or other sensors 145 or various combinations thereof, may be utilized by processor 110 and/or DSP 120 or other processing systems to control power and drive systems 175 and systems (brake actuator, throttle control, steering, electrical, etc.) 155.

A global navigation satellite system (GNSS) receiver may be utilized to determine position relative to the earth (absolute position) and, when used with other information such as measurements from other objects and/or mapping data, to determine position relative to other objects such as relative to other cars and/or relative to the road surface.

In an embodiment, GNSS receiver 170 may support one or more GNSS constellations as well as other satellite-based navigation systems. For example, in an embodiment, GNSS receiver 170 may support global navigation satellite systems such as the Global Positioning System (GPS), the Global'naya Navigatsionnaya Sputnikovaya Sistema (GLONASS), Galileo, and/or BeiDou, or any combination thereof.

In an embodiment, GNSS receiver 170 may support regional navigation satellite systems such as NAVIC or QZSS or combination thereof as well as various augmentation systems (e.g., satellite based augmentation systems (SBAS) or ground based augmentation systems (GBAS)) such as doppler orbitography and radio-positioning integrated by satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver(s) 130 and antenna(s) 132 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 170 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from roadside devices 425, also known as roadside units or RSU, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

Radio detection and ranging, Radar 153, uses transmitted radio waves that are reflected off of objects. The reflected radio waves are analyzed, based on the time taken for reflections to arrive and other signal characteristics of the reflected waves to determine the location of nearby objects. Radar 153 may be utilized to detect the location of nearby cars, roadside objects (signs, other vehicles, pedestrians, etc.) and will generally enable detection of objects even if there is obscuring weather such as snow, rail or hail. Thus, radar 153 may be used to complement LIDAR 150 systems and camera 135 systems in providing ranging information to other objects by providing ranging and distance measurements and information when visual-based systems typically fail. Furthermore, radar 153 may be utilized to calibrate and/or sanity check other systems such as LIDAR 150 and camera 135. Ranging measurements from radar 153 may be utilized to determine/measure stopping distance at current speed, acceleration, maneuverability at current speed and/or turning radius at current speed and/or a measure of maneuverability at current speed. In some systems, ground penetrating radar may also be used to track road surfaces via, for example, RADAR-reflective markers on the road surface or terrain features such as ditches.

As shown in FIG. 2, in an embodiment, vehicle 100 may have camera(s) such as rear view mirror-mounted camera 1006, front fender-mounted camera (not shown), side mirror-mounted camera (not shown) and a rear camera (not shown, but typically on the trunk, hatch or rear bumper). Vehicle 100 may also have a LIDAR subsystem 204, for detecting objects and measuring distances to those objects; LIDAR SYSTEM 204 is often roof-mounted, however, if there are multiple LIDAR units 204, they may be oriented around the front, rear and sides of the vehicle. Vehicle 100 may have other various location-related systems such as a GNSS receiver 170 (typically located in the shark fin unit on the rear of the roof), various wireless transceivers (such as WAN, WLAN, V2X; typically but not necessarily located in the shark fin) 202, RADAR system 208 (typically in the front bumper), and SONAR 210 (typically located on both sides of the vehicle, if present). Various wheel 212 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 2 is intended to provide exemplary locations of various sensors in an embodiment of vehicle 100. In addition, further detail in regard to particular sensors is described relative to FIG. 1.

Figure 3:
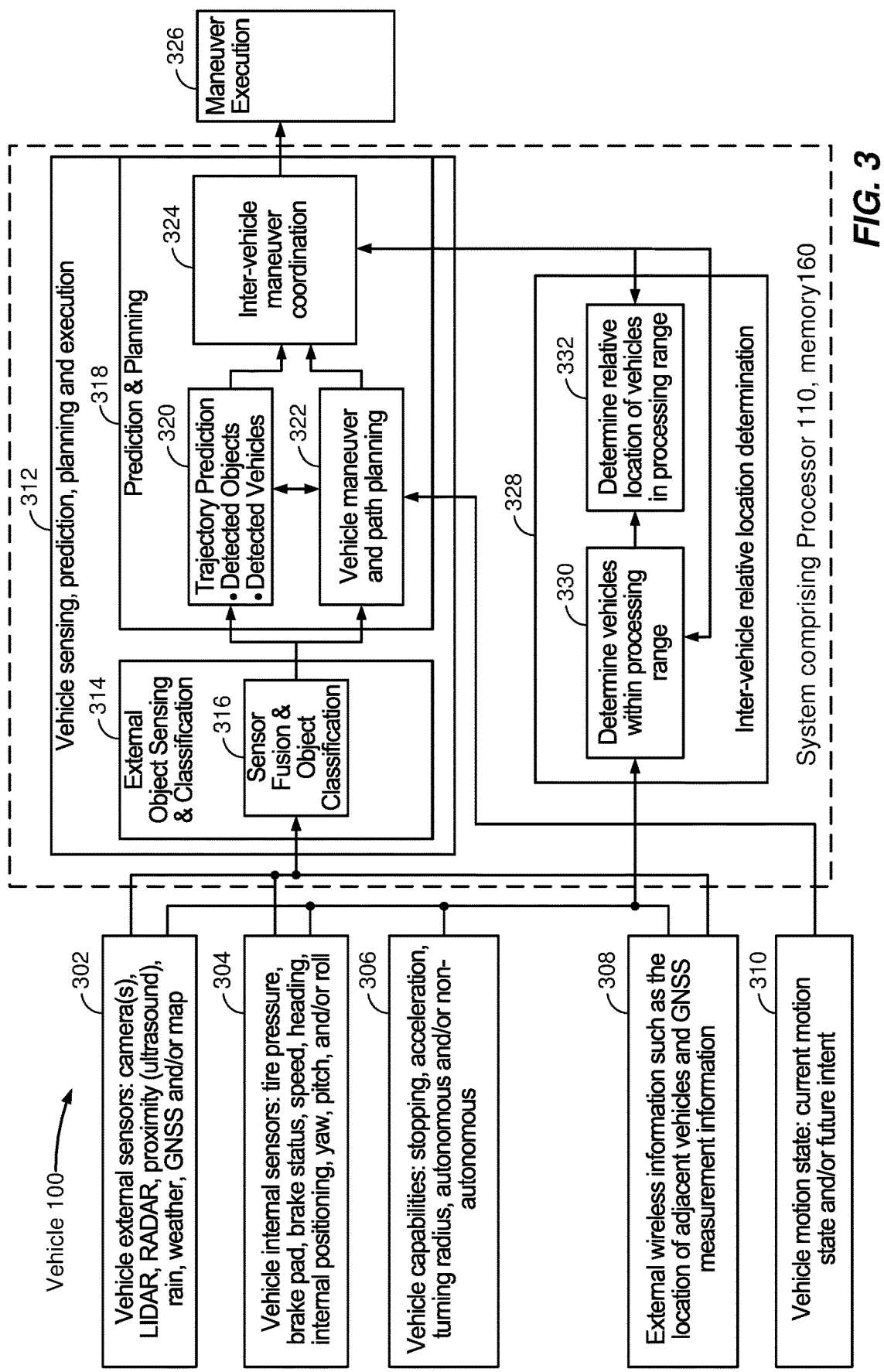
FIG. 3 illustrates a functional block level embodiment for a vehicle using V2X to obtain GNSS measurement data for nearby cars.

As shown in FIG. 3, in an embodiment, vehicle 100 may receive vehicle and environment information from vehicle external sensors 302, vehicle internal sensors 304, vehicle capabilities 306, external wireless information such as the location of adjacent vehicles and GNSS measurement information 308 (from the environment, from other vehicles, from roadside devices/units (RSUs), from system servers) and/or from vehicle motion state 310 (describing current and/or future motion states). The received vehicle, sensor, and environment information may, in an embodiment, be processed in one or more processor(s) 110, DSP(s) 120 and memory, connected and configured to provide external object sensing and classification, prediction and planning, and maneuver execution, as well as to determine and update V2X or other wireless data element values, including GNSS data element values, and to transmit, via one or more wireless transceivers 130, messaging including the determined data elements. The messaging and data elements may be sent and received via various means, protocols and standards, such as via SAE or ETSI CV2X messages and data elements or other wireless and wireless V2X protocols supported by wireless transceiver(s) 130. Also, note that, when used in the context of this specification, the term ego vehicle refers to vehicle 100.

Inter-vehicle relative location determination block 328 comprises block 330 for determining which vehicles are within processing range and 332 for determining the relative location of vehicles in processing range. In an embodiment, GNSS data is exchanged with vehicles in processing range, or other devices such as roadside units, as determined by block 330, where the received GNSS data from vehicles within processing range is used to determine and/or verify and/or increase the accuracy of a relative location associated with other vehicles or devices in processing range in block 332. In one embodiment, determining vehicles (or other devices) within processing range block 330 may utilize broadcast location information such as broadcast latitude and longitude from nearby vehicles or other devices and location information for vehicle 100 to determine an approximate relative location and/or an approximate range between vehicles, such as may be used to determine a whether a vehicle is within a threshold range. For vehicles within a threshold range, a more accurate relative location may be calculated using shared GNSS measurements and/or other sensors on the vehicle. The threshold range may be preset, or may be dynamic, based on speed, road surface conditions and other factors. The threshold range may be an estimated distance or may be based on other factors related to distance such as a threshold signal strength or a timing-related measurement based on wireless signal-based round trip time (RTT) or time of arrival (TOA). A more accurate relative location of and range to each nearby vehicle within processing range may be determined using GNSS data received from vehicles in processing range, as described above, such as via carrier phase double differencing and/or by using constrained relationships, such as three-way vehicle constrained vector relationships. The measurements may also be modified to account for the distance between the vehicle surface and the mounting location of the GNSS antenna on the vehicle. Wireless information, such as V2X information, from other vehicles may, in an embodiment, be provided via wireless transceiver(s) 130 and may, in an embodiment, be received and/or exchanged with other vehicles via inter-vehicle negotiation.

In various embodiments, processing range may be determined in varying and/or multiple ways, for example, depending on the processing power of the receiving vehicle or device and the safety and informational requirements of the receiving vehicle or device. In an embodiment, processing range may be determined by a threshold distance or range within which, the vehicles or devices will send and/or exchange GNSS data and use that GNSS data to calculate precise relative distances between the vehicles and/or devices. In an embodiment, processing range may be selected to encompass nearby or adjacent vehicles. In an embodiment, processing range may be selected to encompass any vehicles that may pose a potential collision risk such as vehicles on either side and in front and in back of the vehicle and/or including vehicles in a non-parallel path that may be further away, such as those on a perpendicular and intersecting street or those on the same street but going in the opposing direction as well as those directly adjacent to the vehicle. In some embodiments, the mapping data will also be considered, such that vehicles going in the opposite direction on the same road may be monitored even though the road may turn and their current directions are not perpendicular. In some embodiments, GNSS information may be broadcast to all vehicles and/or devices in reception range, where reception range becomes equivalent to processing range; in such an embodiment, it may the receiving device may still impose a range or other selection criteria to decide if a more accurate relative location based upon GNSS measurements should be calculated. In an embodiment, the processing range may be variable, increasing when there are fewer cars nearby and decreasing when there are many cars nearby, in an embodiment, possibly based on a maximum processing burden imposed by receiving device on how many ranges will be tracked simultaneously. In an embodiment, a vehicle may request GNSS measurement information for vehicles or devices outside of a nominal processing range, for example, to monitor traffic at a distance or to track an erratic vehicle or for other more specialized requests.

In an embodiment, other vehicle-related input sources, such as servers 455, 445, 460, 450, and 440, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 324 to determine maneuver execution 326. In an embodiment, the map data may include locations of roadside units relative to the road location, where the vehicle may utilize relative GNSS-based positioning between a roadside device/roadside unit in combination with the map data to determine positioning relative to the road surface, particularly in situations where other systems may fail such as due to low visibility weather conditions (snow, rain, sandstorm, etc.). It is understood that the terms roadside unit and roadside device may be used interchangeably to refer to stationary reference, control and/or messaging devices. In an embodiment, map data from map server 450 may be utilized in conjunction with relative and/or absolute data from neighboring vehicles and/or from a roadside unit (RSU) 425 to determine high confidence absolute location for a plurality of vehicles and relative location with respect to the road/map. For example, if vehicle A 480 has high accuracy/high confidence location than other vehicles in communication with vehicle A 480, such as vehicle B 490 may use GNSS information for a highly accurate relative location and the highly accurate location from vehicle A 480 sent to vehicle B 490 to determine a highly accurate location for vehicle B 490, even if the systems of vehicle B 490 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 450 is accurate, the ability to propagate highly accurate location data from vehicle A 480 to surrounding vehicles such as vehicle B 490 enables the surrounding vehicles to also accurately determine their relative location versus the map data, even in otherwise troublesome signal/location environments. Vehicle information server 455 may provide vehicle information such as size, shape, and antenna location which may be utilized, for example, by vehicle A or other vehicles to determine not just the relative location between the GNSS receiver on vehicle A 480 and, for example, vehicle B 490, but also the distance between the closest points of Vehicle A 480 and Vehicle B 490. In an embodiment, traffic information from the traffic control and optimization server 465 may be utilized to determine overall path selection and rerouting, used in conjunction with route server 445 (in an embodiment). In an embodiment, environmental data server 440 may provide input on road conditions, black ice, snow, water on the road and other environmental conditions which may also impact the decisions and decision criteria in inter-vehicle maneuver coordination block 325 and maneuver execution block 326. For example, in icy or rainy conditions, the vehicle 100 may execute and/or request increased inter-vehicle distance from adjacent vehicles or may choose route options that avoid road hazard conditions such as black ice and standing water.

Blocks 330 and 332 may be implemented using various dedicated or generalized hardware and software, such as using processor 110 and/or DSP 120 and memory 160 or, in an embodiment, in specialized hardware blocks such as dedicated sensor processing and/or vehicle messaging cores. As previously discussed, in block 330, vehicles within processing range may be determined through various means such as based on signal-based timing measurements such as RTT and TOA, signal strength of a broadcast signal for the other vehicle, and a distance determined based upon broadcast latitude and longitude from a neighboring vehicle and the current location of the vehicle. In block 332, the relative location of other vehicles relative to the vehicle location may be determined based on various sensor measurements including, but not necessarily limited to GNSS measurements (such as doppler and phase measurements) from the other vehicle and may also utilize other sensor measurements such as LIDAR, RADAR, SONAR and camera measurements. In an embodiment, some or all of blocks 302, 304, 306, 308 and/or 310 may have dedicated processing cores, for example, to improve performance and reduce measurement latency. In an embodiment, some or all of blocks 302, 304, 306, 308 and/or 310 may share processing with blocks 330 and 332.

Vehicle external sensors 302 may comprise, in some embodiments, cameras 206, LIDAR SYSTEM 204, RADAR SYSTEM 208, proximity sensors, rain sensors, weather sensors, GNSS receivers 170 and received data used with the sensors such as map data, environmental data, location, route and/or other vehicle information such as may be received from other vehicles, devices and servers such as, in an embodiment, map server 450, route server 445, vehicle information server 455, environmental data server 440, location server 460, and/or from associated devices such as mobile device 400, which may be present in or near to the vehicle such as vehicle A 480. For example, in an embodiment, mobile device 400 may provide an additional source of GNSS measurements, may provide an additional source of motion sensor measurements, or may provide network access as a communication portal to a WAN, WiFi or other network, and as a gateway to various information servers such as servers 440, 445, 450, 455, 460, and/or 465. It is understood that the vehicle 100 may contain one or a plurality of cameras. In an embodiment, a camera may be front facing, side facing, rear facing or adjustable in view (such as a rotatable camera). In an embodiment, there may be multiple cameras 206 facing the same plane. For example, the cameras 206 and bumper-mounted camera at 208 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR SYSTEM 204 may be roof mounted and rotating or may be focused on a particular point of view (such as front facing, rear facing, side facing). LIDAR SYSTEM 204 may be solid state or mechanical. Proximity sensors may be ultrasonic, radar-based, light-based (such as based on infrared range finding), and/or capacitive (surface touch oriented or capacitive detection of metallic bodies). Rain and Weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 304 may comprise wheel sensors 212 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 304 and vehicle external sensors 302 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 330 to combine measurement values and determine capability value(s) as a function of inputs. The car status values derived from measurements from internal and external sensors may be further combined with car status values and/or measurements from other sensor systems using a general or applications processor. For example, blocks 330, 332 and/or 324 or may be implemented on a dedicated or a centralized processor to determine data element values for V2X messaging which may be sent utilizing wireless transceivers 130 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 130 and antenna(s) 132.

In an embodiment, vehicle capabilities 306 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive train may share performance estimates for drive-performance related estimates such as breaking/stopping distance, turning radius, and acceleration performance. Vehicle performance estimates may also be obtained, for example, using external V2X input(s) 308, over a wireless network from vehicular data servers on the network. This is particularly helpful to obtain information for vehicles that are not wireless capable and cannot provide vehicular information directly. In an embodiment, vehicle capabilities 306 may also be influenced by car component status such as tire wear, tire brand capabilities, brake pad wear, brake brand and capabilities, and engine status. In an embodiment, vehicle capabilities 306 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates when determining capability value(s) as a function of inputs 330. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 302 and/or vehicle internal sensors 304, may be weighted more heavily and/or given preference in determining capability value(s) as a function of inputs 330.

The determined capability value(s), as determined as a function of inputs in block 330, are provided to block 332, update V2X capability data element(s), location information and/or GNSS measurement data may, in an embodiment, be sent via block 324, V2X inter-vehicle negotiation, as may be implemented via various means, such as via communication over wireless transceiver 130 and utilizing various V2X messaging standards, such as via SAE or ETSI CV2X messages and data elements. In an embodiment, one or more processor(s) 30 and/or DSP(s) 120 and memory 160, and the systems described herein, or means therefore, may be connected and configured to perform the processes described in regard to FIG. 3 and throughout this specification. Capability values as a function of inputs 330 may be modified into different data formats and/or units and/or may require other conversion or combination of one or more capability values prior to being utilized as V2X capability data elements. Adjusting data formats and/or units and/or conversion or combination of one or more capability values may be performed, in an embodiment, in processor(s) 110 and update V2X capability data element block 332 or elsewhere in the architecture.

V2X vehicle sensing, prediction, planning execution 312 handles the receipt and processing of information from blocks 302, 304, 306, 308 and 310, via external object sensing and classification block 314, in part utilizing sensor fusion and object classification block 316 to correlate, corroborate and/or combine data from input blocks 302, 304, 306, 308 and 310. Block 314 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 314 may utilize GNSS measurements from other vehicles to determine the relative positioning to other vehicles. This output from block 314 may be provided to prediction and planning block 318, which determines detected objects and vehicles and their associated trajectory via block 320 and determines vehicle maneuver and path planning in block 322, the outputs of which are utilized in block 326 vehicle maneuver execution either directly or via V2X inter-vehicle negotiation block 324, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

Figure 4:
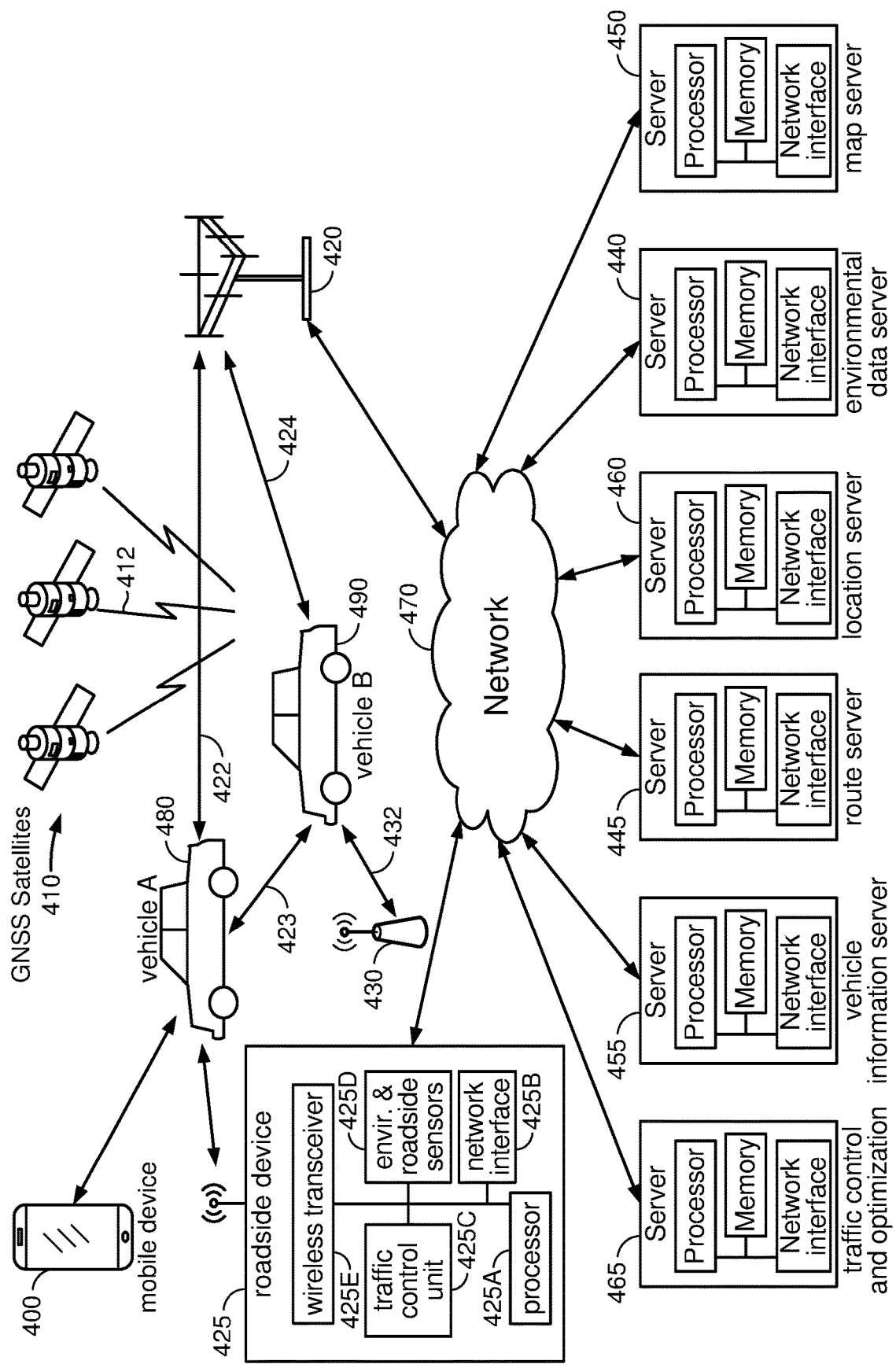
FIG. 4 illustrates an exemplary system for a vehicle performing V2X vehicle sensing, prediction, planning and execution using V2X data elements.

As highlighted in FIG. 4, the vehicle may communicate over various networks and with various devices and servers. In an embodiment, V2X vehicle A 480 may communicate, using V2X or other wireless communication transceiver over link 423, with V2X or otherwise communication-transceiver-enabled vehicle B 490, for example, in an embodiment to perform inter-vehicle relative positioning, negotiation for lane changes or for passage through an intersection, and to exchange V2X data elements such as GNSS measurements, vehicle status, vehicle location and vehicle abilities, measurement data, and/or calculated status, and to exchange other V2X vehicle status steps not covered in the V2X capability data elements. In an embodiment, vehicle A may also communicate with vehicle B through a network, for example, via base station 420 and/or access point 430, or via a communication-enabled roadside device (RSU) 425, any of which may relay communication, information and/or convert protocols for use by other vehicles, such as vehicle B, particularly in an embodiment where vehicle B is not capable of communicating directly with vehicle A 480 in a common protocol. In an embodiment, vehicle A 480 may also communicate with roadside device(s) 425 such as, in various embodiments, various roadside beacons, traffic and/or vehicular monitors, traffic control devices, and location beacons.

In an embodiment, roadside device (RSU) 425 may have a processor 425A configured to operate wireless transceiver 425E to send and receive wireless messages, for example, Basic Safety Messages (BSM) or Cooperative Awareness Messages (CAM) or other V2X messages to/from vehicle A 480 and/or vehicle B 490, from base station 420 and/or access point 430. For example, wireless transceiver 425E may send and/or receive wireless messages in various protocols such as V2X communication with vehicles, and/or using various WAN, WLAN and/or PAN protocols to communicate over a wireless communication network. In an embodiment RSU 425 may contain one or more processors 425A communicatively coupled to wireless transceiver 425E and memory, and may contain instructions and/or hardware to perform as a traffic control unit 425C and/or to provide and/or process environmental and roadside sensor information 425D or to act as a location reference for GNSS relative location between it and vehicles. In an embodiment, RSU 425 may contain a network interface 425B (and/or a wireless transceiver 425E), which, in an embodiment, may communicate with external servers such as traffic optimization server 465, vehicle information server 455, and/or environmental data server 440. In an embodiment, wireless transceiver 425E may communicate over a wireless communication network by transmitting or receiving wireless signals from a wireless base transceiver subsystem (BTS), a Node B or an evolved NodeB (eNodeB) or a next generation NodeB (gNodeB) over wireless communication link. In an embodiment, wireless transceiver(s) 425E may comprise various combinations of WAN, WLAN and/or PAN transceivers. In an embodiment, a local transceiver may also be a Bluetooth transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). It should be understood that these are merely examples of networks that may communicate with an RSU 425 over a wireless link, and claimed subject matter is not limited in this respect.

RSU 425 may receive location, status, GNSS and other sensor measurements, and capability information from vehicle A 480 and/or vehicle B 490 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU 425 may utilize received information, via wireless transceiver 425E, from vehicle A 480 and/or vehicle B 490, environmental and roadside sensors 425D, and network information and control messages from, for example, traffic control and optimization server 465 to coordinate and direct traffic flow or vehicle velocity or vehicle position and to provide environmental, vehicular, safety and announcement messages to vehicle A 480 and vehicle B 490.

Processor 425A may be configured to operate a network interface 425B, in an embodiment, which may be connected via a backhaul to network 470, and which may be used, in an embodiment, to communicate and coordinate with various centralized servers such as a centralized traffic control and optimization server 465 that monitors and optimizes the flow of traffic in an area such as within a city or a section of a city or in a region. Network interface 425B may also be utilized for remote access to roadside device (RSU) 425 for crowd sourcing of vehicle data, maintenance of the roadside device (RSU) 425, and/or coordination with other roadside devices 425 or other uses. Roadside device (RSU) 425 may have a processor 425A configured to operate traffic control unit 425C which may be configured to process data received from vehicles such as vehicle A 480 and vehicle B 490 such as location data, stopping distance data, road condition data, identification data and other information related to the status and location of nearby vehicles and environment. Roadside device (RSU) 425 may have a processor 425A configured to obtain data from environmental and roadside sensors 425D, which may include temperature, weather, camera, pressure sensors, road sensors (for car detection, for example), accident detection, movement detection, speed detection and other vehicle and environmental monitoring sensors.

In an embodiment, vehicle A 480 may also communicate with mobile device 400 using short range communication and personal networks such as Bluetooth, WiFi or Zigbee or via V2X or other vehicle-related communication protocols, for example, in an embodiment to access WAN and/or WiFi networks and/or, in an embodiment, to obtain sensor and/or location measurements from mobile device 400. In an embodiment, vehicle A 480 may communicate with mobile device 400 using WAN related protocols through a WAN network, such as via WAN base station 420 or using WiFi either directly peer to peer or via a WiFi access point. Vehicle A 480 and/or vehicle B 490 may communicate using various communication protocols. In an embodiment, vehicle A 480 and/or vehicle B 490 may support various and multiple modes of wireless communication such as, for example, using V2X, GSM, WCDMA, LTE, CDMA, HRPD, Wi-Fi, BT, WiMAX, Long Term Evolution (LTE), 5th Generation Wireless (5G) new radio access technology (NR) communication protocols, etc.

In an embodiment, vehicle A may communicate over WAN networks using WAN protocols via base station 420 or with wireless LAN access point 430 using wireless LAN protocols such as WiFi. A vehicle may also support wireless communication using a wireless LAN (WLAN), personal area network (PAN) such as Bluetooth or ZigBee, DSL or packet cable for example.

Vehicle A 480 and/or vehicle B 490, in an embodiment, may contain one or more GNSS receivers such as GNSS receiver 170 for reception of GNSS signals 412, from GNSS satellites 410, for location determination, time acquisition and time maintenance. Various GNSS systems may be supported alone or in combination, using GNSS receiver 170 or other receiver, to receive signals from Beidou, Galileo, Glonass, and/or GPS, and various regional navigational systems such as QZSS and NavIC or IRNSS. Other wireless systems may be utilized such as those depending on beacons such as, in an example, one or more roadside devices (RSU) 425, one or more wireless LAN access point 430 or one or more base stations 420. Various GNSS signals 412 may be utilized in conjunction with car sensors 140 and/or 145 to determine location, velocity, proximity to other vehicles such as between vehicle A 480 and vehicle B 490.

In an embodiment, vehicle A and/or vehicle B may access GNSS measurements and/or locations determined at least in part using GNSS as provided by mobile device 400, which, in an embodiment would also have GNSS, WAN, WiFi and other communications receivers and/or transceivers. In an embodiment, vehicle A 480 and/or vehicle B 490 may access GNSS measurements (such as pseudorange measurements, doppler measurements and satellite IDs) and/or locations determined at least in part using GNSS as provided by mobile device 400 as a fallback in case GNSS receiver 170 fails or provides less than a threshold level of location accuracy.

Vehicle A 480 and/or Vehicle B 490 may access various servers on the network such as vehicle information server 455, route server 445, location server 460, map server 450, and environmental data server 440.

Vehicle information server 455, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 455 may also provide information in regard to vehicle size, shape, capabilities, identification, ownership, occupancy, and/or determined location point (such as, for example, the location of the GNSS receiver) and the location of the car boundaries relative to the determined location point.

Route server 445, may receive current location and destination information, and provide routing information for the vehicle, map data, alternative route data and/or traffic and street conditions data.

Location server 460, in an embodiment, may provide location determination capabilities, transmitter signal acquisition assistance (such as GNSS satellite orbital predictions information, time information approximate location information and/or approximate time information), transceiver almanacs such as those containing identification of and location for WiFi access points and base stations, and, in some embodiments, additional information relative to the route such as speed limits, traffic, and road status/construction status. Map server 450 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 440 may, in an embodiment, provide weather and/or road related information, traffic information, terrain information, and/or road quality & speed information and/or other pertinent environmental data. V In an embodiment, Vehicles 480 and 490 and mobile devices 400, in FIG. 4, may communication over network 470 via various network access points such as wireless LAN access point 430 or wireless WAN base station 420 over network 470. Vehicles 480 and 490 and mobile devices 400, in FIG. 12, may also, in some embodiments, communicate directly between devices, between vehicles and device to vehicle and vehicle to device using various short range communications mechanisms to communicate directly without going over network 470, such as via Bluetooth, Zigbee and 5G new radio standards.

Figure 5:
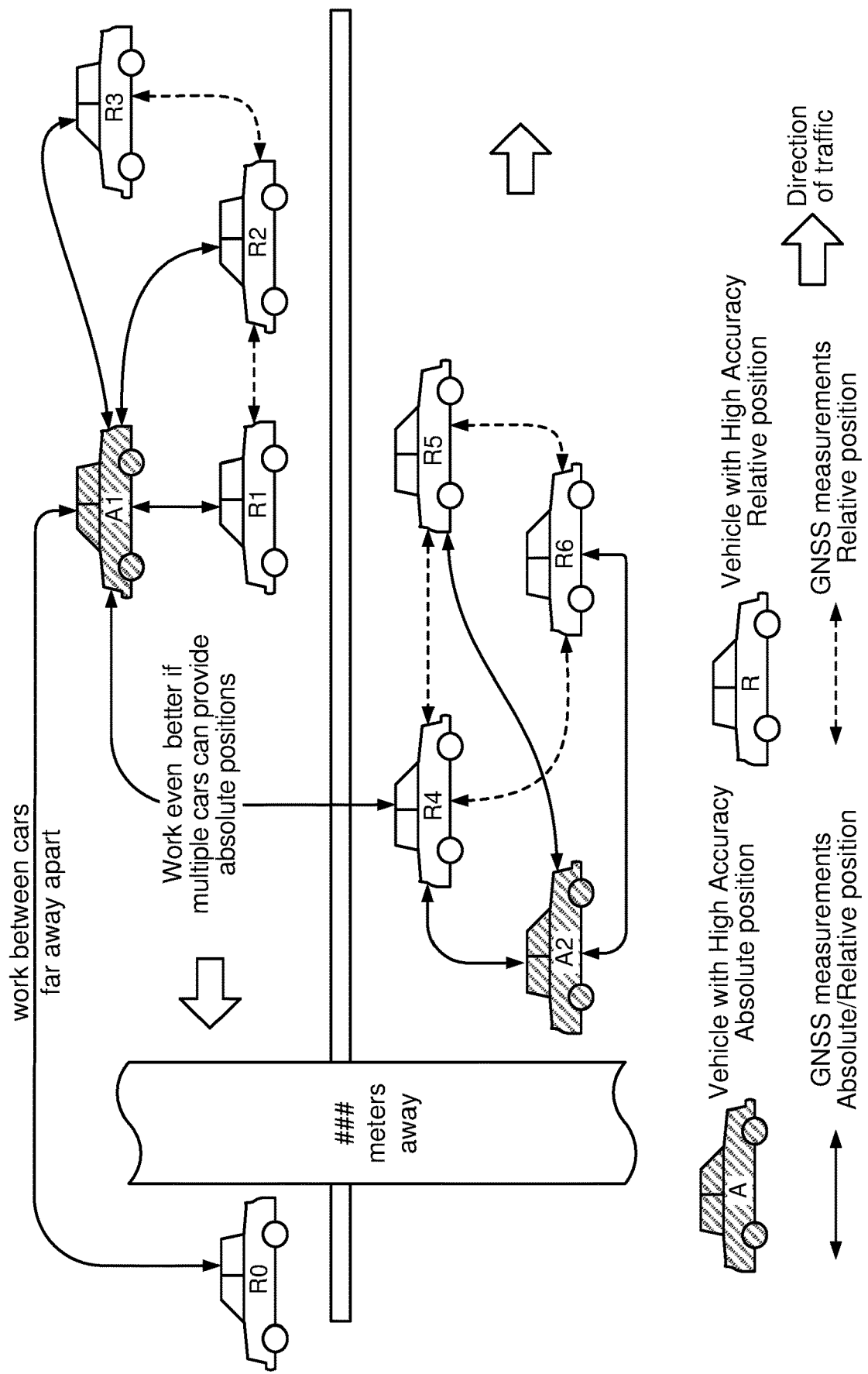
FIG. 5 illustrates the use of carrier phase and/or other relative positioning methods between vehicles and the use of a vehicle with high accuracy position capability as a reference for absolute position to other vehicles.

FIG. 5 illustrates the use of high accuracy relative position, in an embodiment, determined using shared GNSS measurements, as discussed above, between various vehicles and/or devices. The embodiments above discussed the use of double differencing using shared measurements for signals from two or more satellites. The embodiments above also discussed constraining the results, for example, by utilizing the vectors between multiple cars, as illustrated in FIG. 17. In FIG. 5, some of the vehicles and devices, vehicles and devices here used interchangeably, are referred to as vehicles and/or devices with a high accuracy position and are able to determine a high accuracy absolute position, for example, with meter level or even centimeter level accuracy.

In an embodiment, a vehicle with access to a high accuracy absolute position may, for example, have a clear view of the sky, such that it can measure GNSS satellite signals with less impact from multipath and signal degradation. In an embodiment, a vehicle with access to a high accuracy absolute position may, utilize other sensor systems such as vehicular dead reckoning systems (using, for example, wheel ticks and measurements from gyros and accelerometers), camera-based positioning, LIDAR, RADAR and/or SONAR or some combination thereof to increase the accuracy and the confidence level associated with its position. In an embodiment, a vehicle or device with access to a high accuracy absolute position may be located/installed in a fixed position such as a roadside device (RSU) where an exact location is known or may be calculated through repetitive location determination over time, or a vehicle that remains parked in a fixed location over a longer period of time such that it may improve the accuracy of its location over time, such as through repetitive location determination over time and/or through relative positioning with other vehicles and/or devices.

In an embodiment, a vehicle without access to a high accuracy absolute position may, for example, have a blocked view of the sky (for example, in dense urban scenarios subject to signal blockage caused by large buildings), such that measured GNSS satellite signals at the impacted GNSS receiver are subject to significant impact from multipath and signal degradation. Note, however, that nearby vehicles may be subject to the same GNSS signal degradation (multipath, signal blockage, ionospheric error, tropospheric error, etc.) such that double differencing of satellite signals received at two nearby receivers may result in highly accurate relative positioning even where highly accurate absolute positioning is not easily available. In an embodiment, a vehicle with access to other relative positioning-related sensor systems such as camera-based positioning, LIDAR, RADAR and/or SONAR may also combine accurate relative locations between vehicles or devices with a highly accurate absolute position from one of the vehicles or devices to propagate highly accurate absolute position among devices and vehicles that may otherwise not have access, at that moment, to highly accurate absolute positioning; however, the relative positioning is likely to be less accurate than relative positioning determined using shared GNSS measurement information.

In an embodiment, vehicles and/or devices may share vehicle or device ID, GNSS measurements, vehicle or device location, and/or, in some embodiments, a measure of confidence and/or an estimate of error or some combination of location, measurements and/or confidence or error, thereof, to enable vehicles and devices to determine high accuracy relative position and, when available, to also propagate high accuracy absolution positioning. In an embodiment, vehicles and/or devices may broadcast their location and/or their GNSS measurements to other vehicles and/or nearby devices. In some embodiments, there may be a mix of broadcast and point to point communication and information sharing, such as by broadcasting a vehicle's or device's location, and in some embodiments, error estimates and/or uncertainty estimates, but by sending GNSS signal measurements only to vehicles and/or devices that request it, such as may be determined, for example, using the broadcast location, to be within a threshold range. Vehicles that otherwise did not have access to a highly accurate absolute position but that had access to a highly accurate relative position may thereby increase the accuracy and the confidence level associated with their position.

In an embodiment, a vehicle or device with access to a high accuracy absolute position may be located/installed in a fixed position such as a roadside device (RSU) where an exact location is known or may be calculated through repetitive location determination over time. Similarly, a vehicle that remains parked in a fixed location over a longer period of time, may improve the accuracy of its location over time, such as through repetitive location determination over time and/or through relative positioning with other vehicles and/or devices, to be able to determine, and in an embodiment, share a highly accurate absolution position with other devices and vehicles. In an embodiment, a roadside device RSU may also manage traffic or manage and control access to an intersection, such as a traffic light or traffic controller, and may utilize relative positions to vehicles in the vicinity to determine and control vehicle flow and vehicle access to intersections, exits and other road resources.

Whether moving or fixed, the vehicle or device with access to a high accuracy absolute position may be used as a reference point so that other vehicles and/or devices that have access to a shared GNSS measurements may combine a highly accurate absolute position from the reference vehicle or device with a highly accurate relative position determined using shared GNSS measurements between the devices to propagate highly accurate absolute positions to vehicles and devices that would otherwise only have access to accurate relative positions. By sharing absolute position from the vehicle or device with access to a highly accurate absolute position and also sharing GNSS measurements between the vehicle or device with access to a highly accurate absolute position and the vehicle or device without access to a highly accurate absolute position, the highly accurate relative position determined using the GNSS measurements between the vehicle or device with access to a highly accurate absolute position and the vehicle or device without access to a highly accurate absolute position, the accurate absolute position from the vehicle or device with access to a highly accurate absolute position and accurate relative position between the two vehicles may be combined to determine an accurate absolute position for the vehicle that was otherwise did not have access to a high accuracy absolute position.

Figure 6:
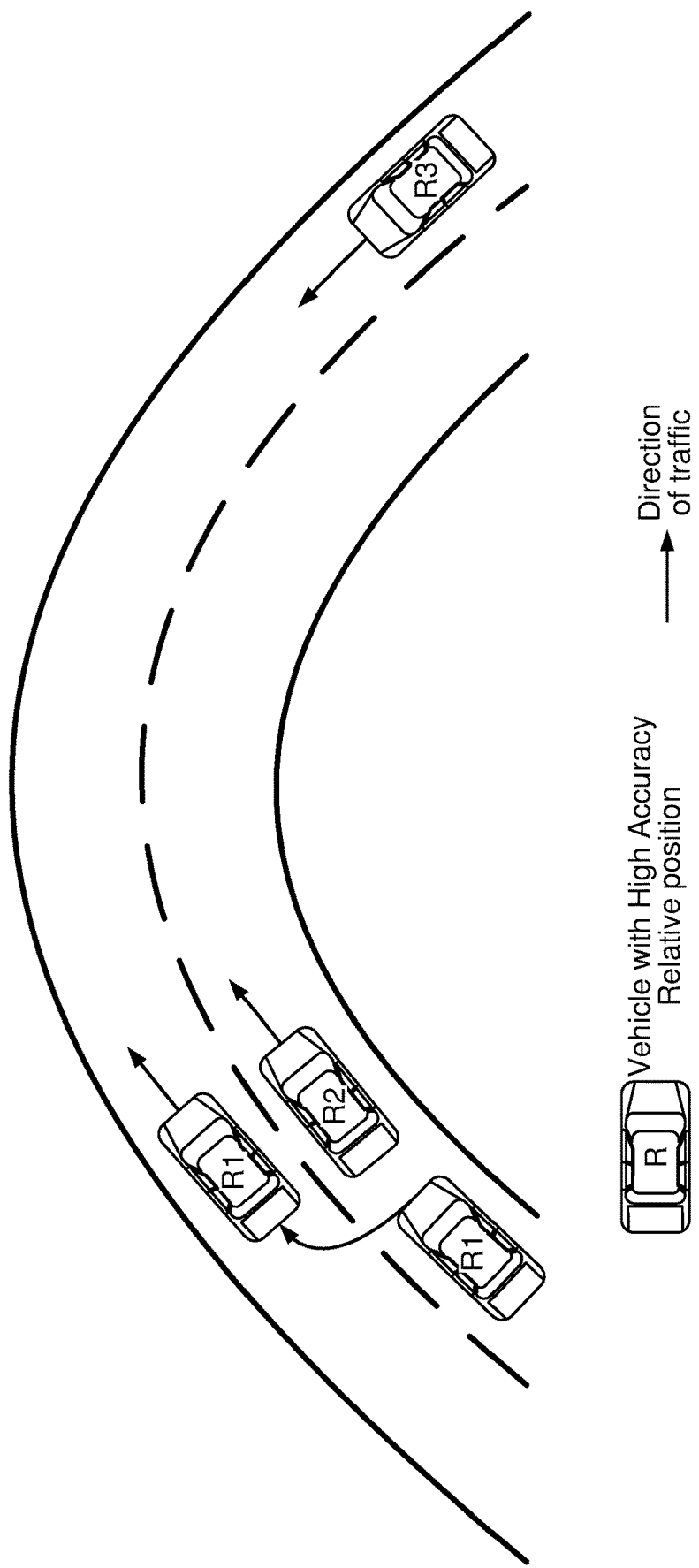
FIG. 6 illustrates the use of relative positioning between vehicles without clear line of sight to each other.

FIG. 6 illustrates a use scenario for a vehicle with high accuracy relative position capability. Here, vehicles are approaching around a blind curve. Vehicle R3 cannot see vehicles R1 and R2 until it is possibly too late to avoid a collision. This is certainly true with human drivers but may also be the case with forward-looking camera systems, RADAR, LIDAR and other relative positioning systems. Furthermore, the curve may be blocked with foliage or other matter such at the drivers on either side cannot see around the curve. However, GNSS system signals, which are sent downwards to earth from the various constellations, do not suffer from the lateral view blockage. Therefore, any or all of vehicles R1, R2 and R3 may share location and GNSS information with each other, enabling instructions and/or an alert to R1 to pull back to the right lane and instructions and/or an alert to R3 to slow down to allow R1 to complete the lane change back into the right lane. Similarly, if a roadside unit were present at the curve, it could be utilized to determine the relative locations between the approaching vehicles and/or between all vehicles in the vicinity. A roadside unit (RSU) could also act as a traffic controller to determine where vehicles are located in the vicinity and to provide approach and departure management and instructions.

Figure 7:
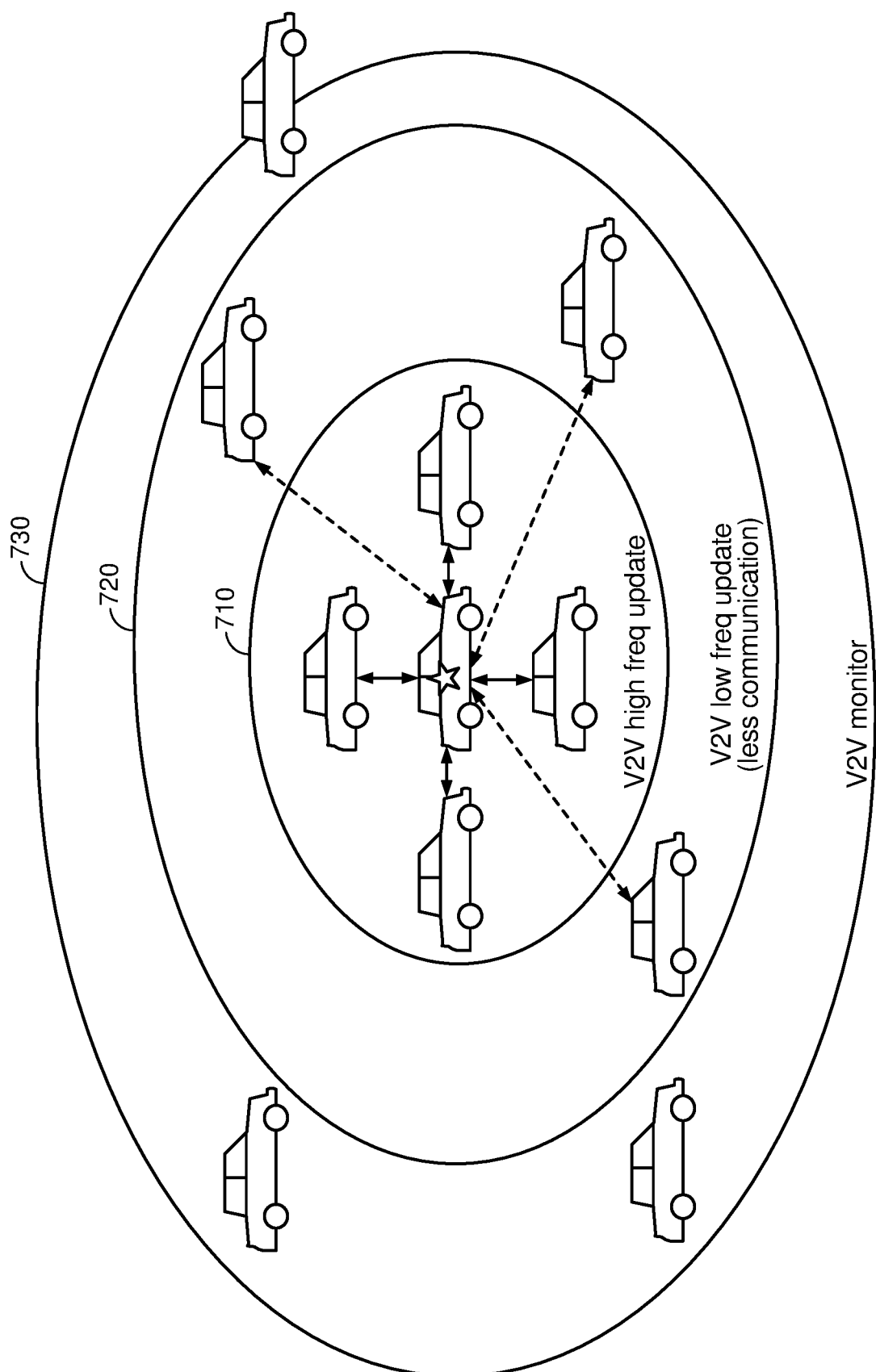
FIG. 7 illustrates a vehicle to vehicle (V2V)-based embodiment for determining relative position.

FIG. 7 illustrates a vehicle/device to vehicle/device communication architecture where vehicles and/or devices share GNSS measurement information, location, identification information and other information, using peer to peer communication. In a peer to peer model, information flow between peers may be consistent across peers, or it may differ based on proximity or it may differ based on collision risk/threat (vehicles that are approaching are a higher risk than vehicles that are moving away; vehicles that are adjacent may have a higher collision risk than those two lanes away or across a cement barrier). Here, for example, vehicles that are closest to the center vehicle and/or are adjacent to the center vehicle (e.g., within ring 710) may share GNSS measurement information more frequently, as designated by the black arrows. Vehicles that are a little further out, for example, not directly adjacent but in view or more than a vehicle away or a determined radius away from the center vehicle (e.g., ring 720), receive GNSS measurement updates at a slower rate. Vehicles significantly further out, for example, more than two vehicles away or greater than a certain even wider radius away (e.g., ring 730), may not receive peer to peer GNSS updates at all. However, even at ring 730, the vehicles and/or devices may still be broadcasting location and ID periodically, so that adjacent vehicles know that they are there and may query for further information to increase accuracy of relative location if and when needed or desired.

Figure 8:
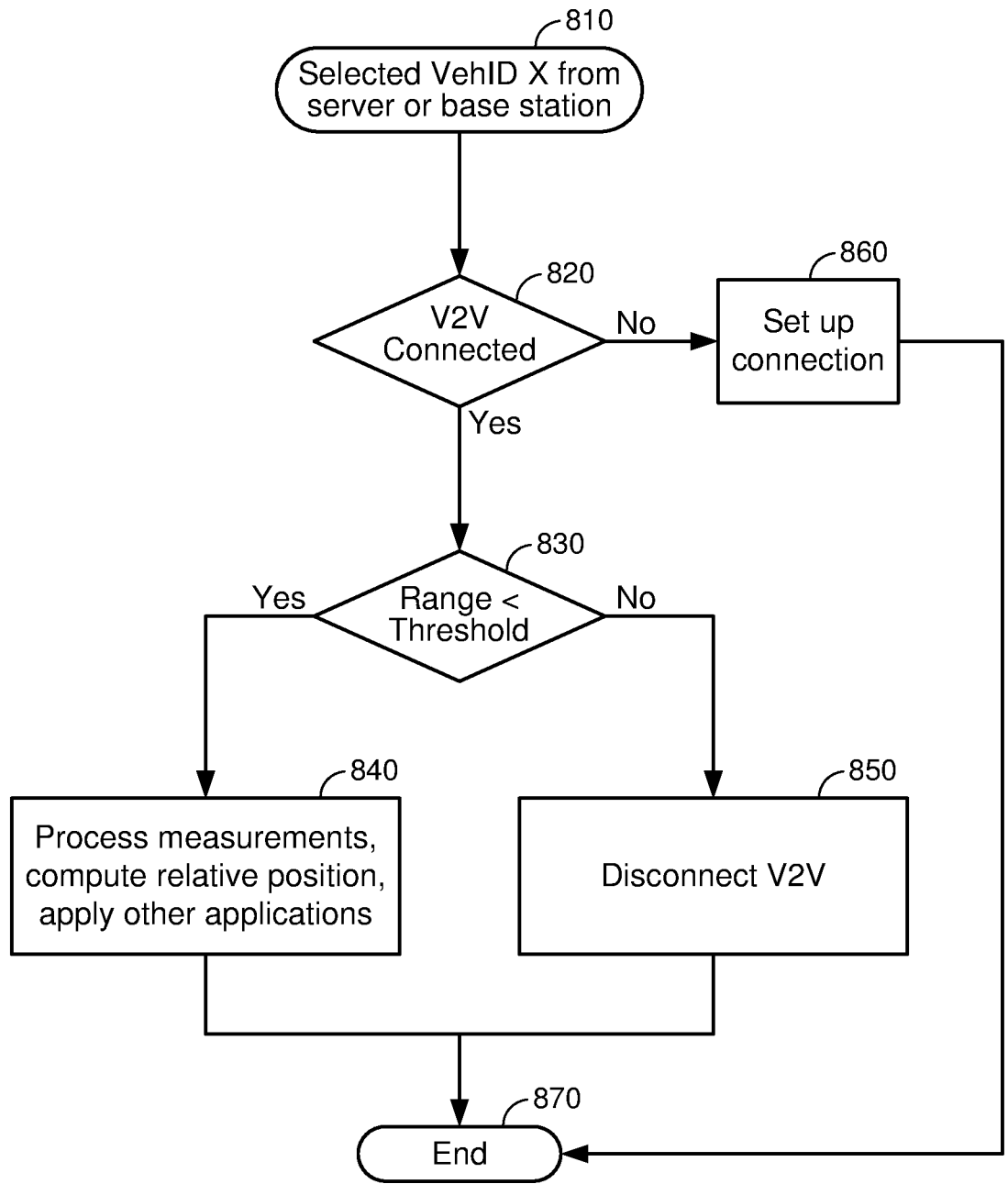
FIG. 8 illustrates a sample embodiment of a process for V2V-based relative positioning.

FIG. 8 illustrates a sample decision tree for peer to peer messaging including sharing of GNSS measurement information to be utilized for relative positioning. In step 810, a vehicle ID may be selected as provided by a server or a base station or as received in an over the air broadcast from other vehicles. In an embodiment, a broadcast ID may also be associated with a location of the source vehicle. In block 820, it is determined if a connection is already established and, if not, in block 860 a connection may be established. The connection may be contingent on the other vehicle being within a particular range or likelihood of being a collision risk. Similarly, if a connection already exists, it may be disconnected in block 850 if the range is greater than a threshold (i.e., the other vehicle is farther than a threshold distance away). If a connection already exists, GNSS measurement information, and/or other information discussed above, may be exchanged and processed if the range is less than a threshold, in block 840. This process may be repeated at block 820 for repetitive relative location determination such that block 860 may be input into block 830 and, instead of ending at block 870, block 840 feeds back into block 820. It is also understood that there may be alternative embodiments to implement a peer to peer model. For example, in block 830, there may be multiple threshold distances, as illustrated in FIG. 7, and measurements may be requested and processed in block 840 at different rates depending on the threshold distance that the target vehicle is within. Those vehicles within the inner circle 710 in FIG. 7 are associated with the smallest threshold and provide GNSS measurements most often, which are also processed the most often.

Figure 9:
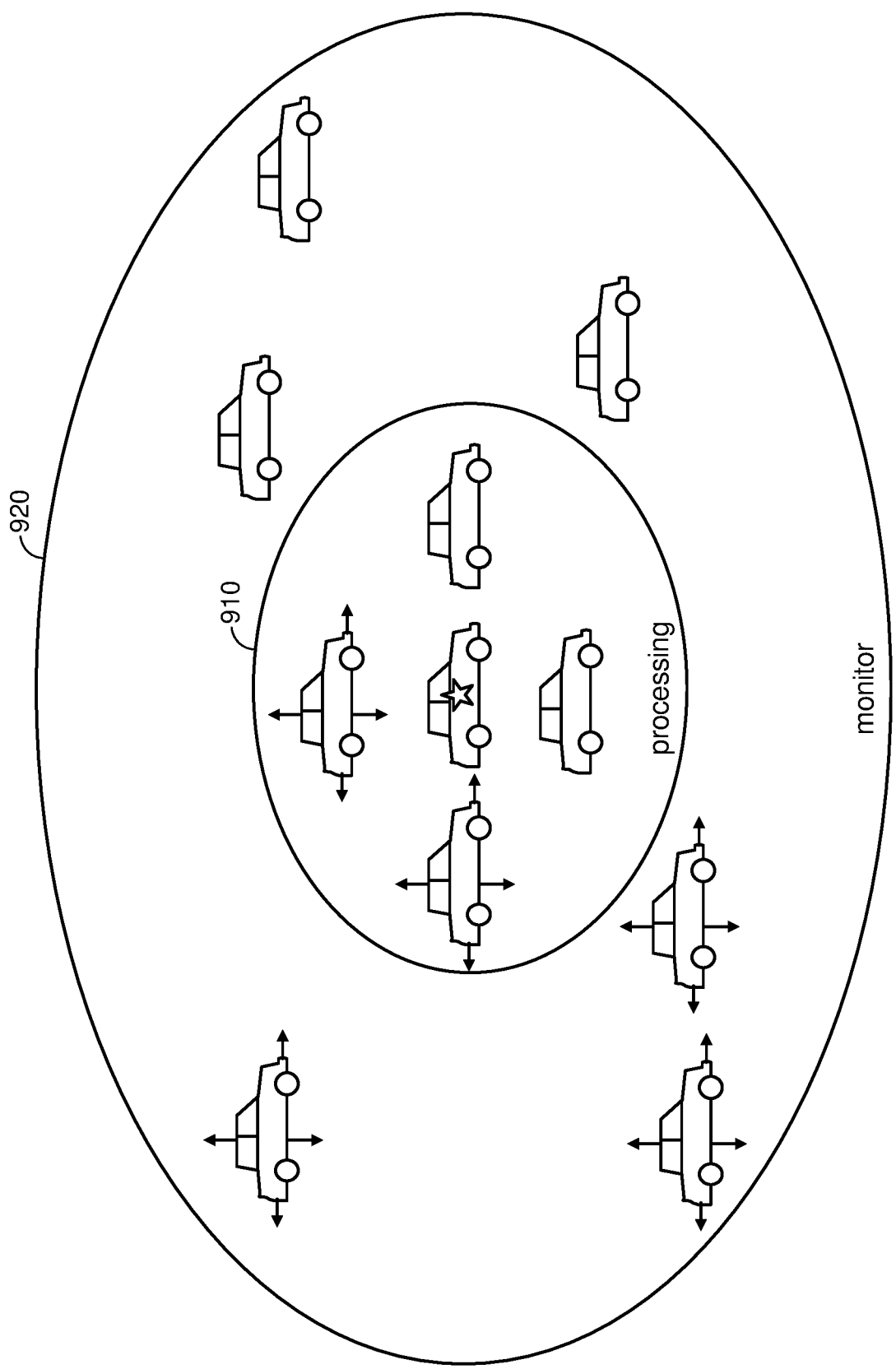
FIG. 9 illustrates a broadcast-based embodiment for determining relative position.

Those vehicles within the middle circle 720 but outside of the inner circle 710, in FIG. 7 are associated with ranges falling between the first and second larger threshold and provide GNSS measurements less often, which are also processed the less often. Those vehicles within the outer circle 730 but outside of the middle circle 720, in FIG. 7, are associated with a range between the second larger threshold and the third largest threshold and do not provide GNSS measurements FIG. 9 illustrates a broadcast positioning model for determining relative position between vehicles, other vehicles, and/or various devices. In a broadcast model, vehicles and devices broadcast their position and GNSS and/or other measurements. The broadcast position of a nearby vehicle may be used for an initial position of the neighboring vehicle and, depending on its accuracy, may also be used to determine relative position. In an embodiment, an error estimate or other measure of accuracy, and/or a confidence level may be provided with the broadcast position. In an embodiment, GNSS measurement information may be utilized to calculate a more precise location, particularly for nearby vehicles which may require a higher level of accuracy to avoid collisions and/or to optimize traffic. In an embodiment, the broadcast may comprise vehicle identification, vehicle location, possibly accompanied by error estimate or accuracy information and/or confidence level, vehicle GNSS measurement information and/or other vehicle and location information. In a broadcast model, there may also be mechanisms employed to minimize cross interference between vehicular communications such as intermittent broadcasts, frequency, time and/or code division to allow many vehicles and devices to broadcast information while minimizing interference. In a broadcast model, to reduce processing overhead on each vehicle, a vehicle may process GNSS measurement information to determine highly accurate relative location for a subset of the vehicles. For example, a vehicle may utilize the broadcast position to determine an approximate range and/or relative position between it and a neighboring vehicle and may determine more precise relative location using GNSS measurements provided by vehicles within the approximate range. In an embodiment, there may be multiple threshold distances, as with the embodiment illustrated in FIG. 7. In such an embodiment, the vehicle may process GNSS measurement information from vehicles within different threshold bands at different rates and, outside of a largest band, may not process GNSS measurement information at all, or only process it upon specific event or request. The processing rate bands are implemented similarly to the implementation for FIG. 7, except that some broadcast embodiments may broadcast GNSS measurement information as well as location and identification information, while some embodiments of the peer to peer model in FIG. 7 may provide GNSS measurement information only upon request from other vehicles. Thus, in an embodiment of the broadcast model, GNSS measurement information broadcast by vehicles within ring 910 is processed at the fastest rate (for example, once per second or multiple times a second), while GNSS measurement information broadcast from vehicles between ring 910 and ring 920 is processed at a slower rate (e.g., once per minute or once per 30 seconds), and GNSS measurement information broadcast from vehicles outside of ring 920 may be ignored or only processed on demand or triggered by some event (such as an accident or excessive speed). In a broadcast model, each vehicle may broadcast information including GNSS measurement information at a fairly high rate, perhaps corresponding to the GNSS measurement rate at the GNSS receiver for the vehicle, or perhaps at some subset thereof. For example, if a vehicle determines measures GNSS signals once per second, it may broadcast GNSS measures no faster than once per second but may broadcast at a slower rate such as once per five seconds or at a variable rate depending on the signal noise floor, broadcasting less often if the noise floor is high and more often if the noise floor is low, to avoid creating excessive interference in the spectrum.

Figure 10:
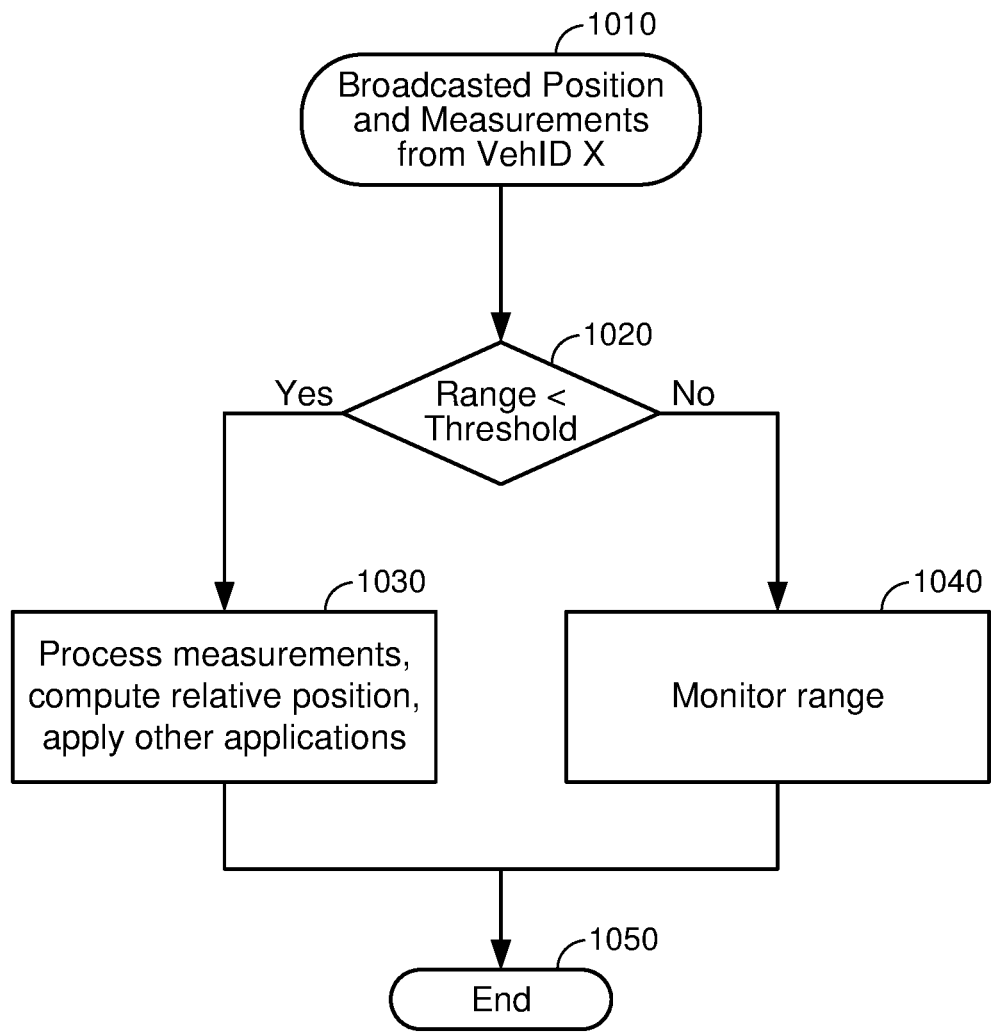
FIG. 10 illustrates a sample embodiment of a process for broadcast-based determination of relative position.

FIG. 10 illustrates a decision chart of a broadcast-based embodiment. In step 1010, broadcast position and GNSS measurements and/or other positioning measurements are received from surrounding vehicles. In step 1020, the received broadcast position and the location of the vehicle are utilized to determine a distance (a.k.a., a range) between the vehicle and the source vehicle for the broadcast position. If the range is less than a threshold range, in block 1030, the GNSS and/or other positioning measurements are processed to determine a relative position of the source vehicle for the broadcast position relative to the vehicle. Other actions and/or applications may be also triggered, for example, based on range less than a threshold or a particular position such as in front, back or on either side of the vehicle. For example, in an embodiment, a relative position in front of and/or in back of the vehicle may trigger a routine and car movement that manage inter-vehicle spacing to manage safe following distance between vehicles. For example, the vehicle may speed up, slow down or request action from the adjacent vehicle to increase or decrease inter-vehicular spacing, and/or may switch lanes to avoid a situation where insufficient vehicle spacing is available (e.g., tail gating by a manually driven vehicle). If the range is not less than a threshold distance, the vehicle may be monitored, in block 1040, or may be ignored in some embodiments. The process may be triggered by receipt of broadcast position and vehicle ID information in block 1010. In an embodiment, the processing of broadcast measurements for particular vehicle IDs may also be determined at different rates depending on the range from the vehicle, such that block 1020 may compare the range to multiple threshold ranges such as less than threshold A, between threshold A and threshold B, and greater than threshold B such each condition going to a different block 1030 which processes GNSS measurement information and/or other positioning measurement information at different rates depending on which band the source vehicle for the broadcast position is in. In an embodiment, for a particular vehicle in a particular band, positioning measurement information between rate boundaries may be ignored or discarded or saved until newer information or a calculate rate boundary occurs.

Figure 11:
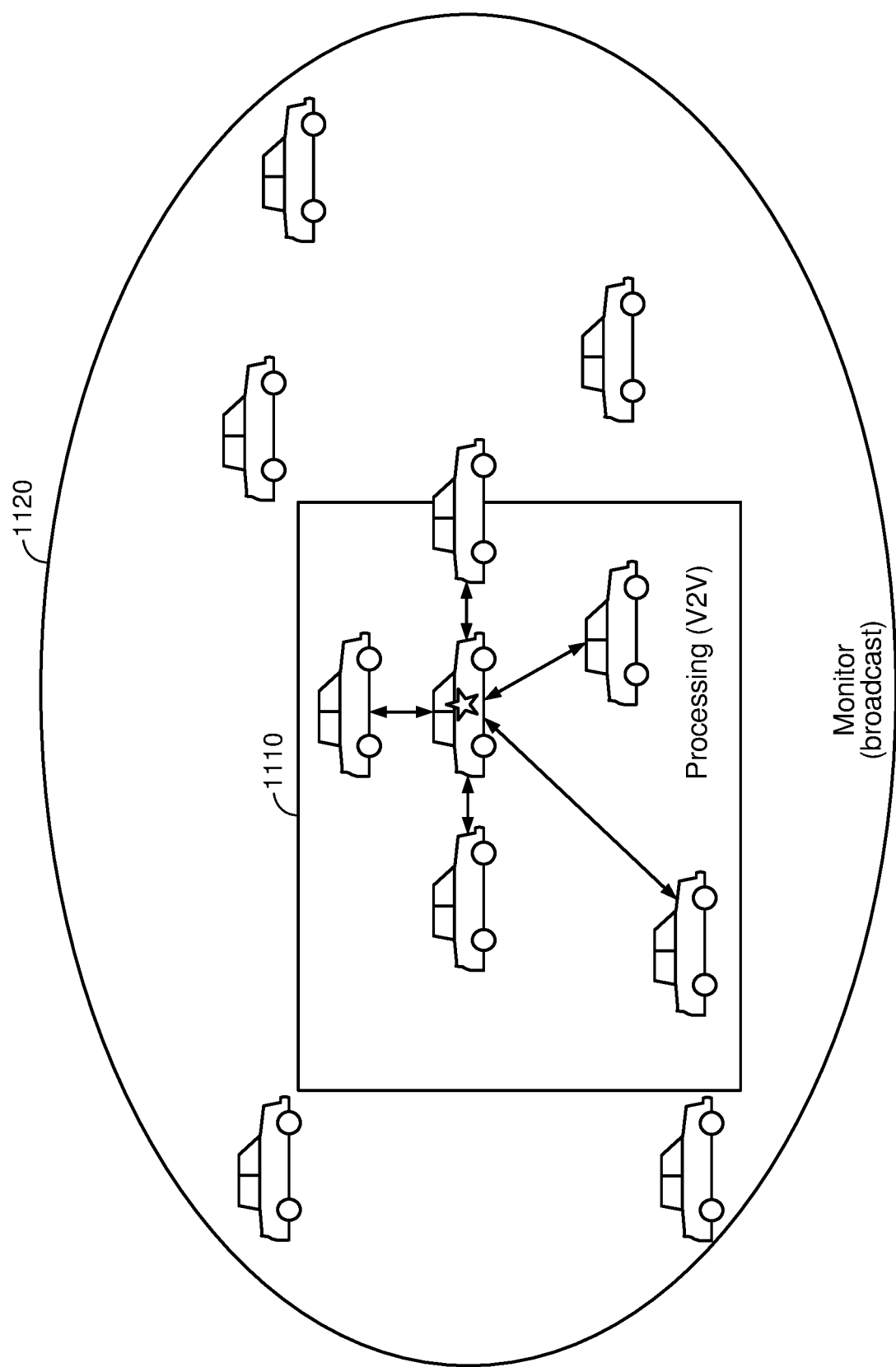
FIG. 11 illustrates an embodiment illustrating a hybrid system for determining relative position that utilizes both broadcast information and V2V-based information.

FIG. 11 illustrates an embodiment where relative position is determined in a mixed mode where all cars exchange (for example, via broadcast) VID (user and/or vehicle identification information) and position information. However, vehicle information is requested by and/or sent only to cars that meet particular relative location criteria. For example, as illustrated in FIG. 11, a vehicle (here, with a star on it) may choose to request GNSS measurement information only from vehicles within a particular range or only from vehicles in front, back or on either side of it, or only from vehicles within a particular geometric boundary (circle, rectangle, square). As with the peer to peer and broadcast models, there may be multiple nested boundaries, which may have different shapes and/or criteria associated with them, such as an interior boundary corresponding only to cars in front, back and on either side of the vehicle and an outer boundary based on a threshold distance, where GNSS measurement information from cars within the inner boundary is requested and processed at a more rapid rate than GNSS measurement information from cars between the inner boundary and the outer boundary. In some embodiments there may be multiple threshold boundaries. In some embodiments, the boundaries may be concentric. In some embodiments, the boundaries may be aligned. In some embodiments, some or all of the boundaries bay be asymmetric or may be modified depending on conditions. For example, a boundary may be selected so that cars on the other side of a physical median are not monitored or positioned or such that only cars that pose a collision risk or risk above a threshold risk are positioned. For example, a boundary may monitor cars only in the rear, in the front and to the right of a vehicle, if the left of the vehicle is occupied by a physical median or barrier (e.g., the vehicle is in the left-most lane of a physically divided highway. In FIG. 11, the solid, bi-directional arrows represent an exchange of GNSS and/or other position measurement information between vehicles within a particular geographical boundary.

Figure 12:
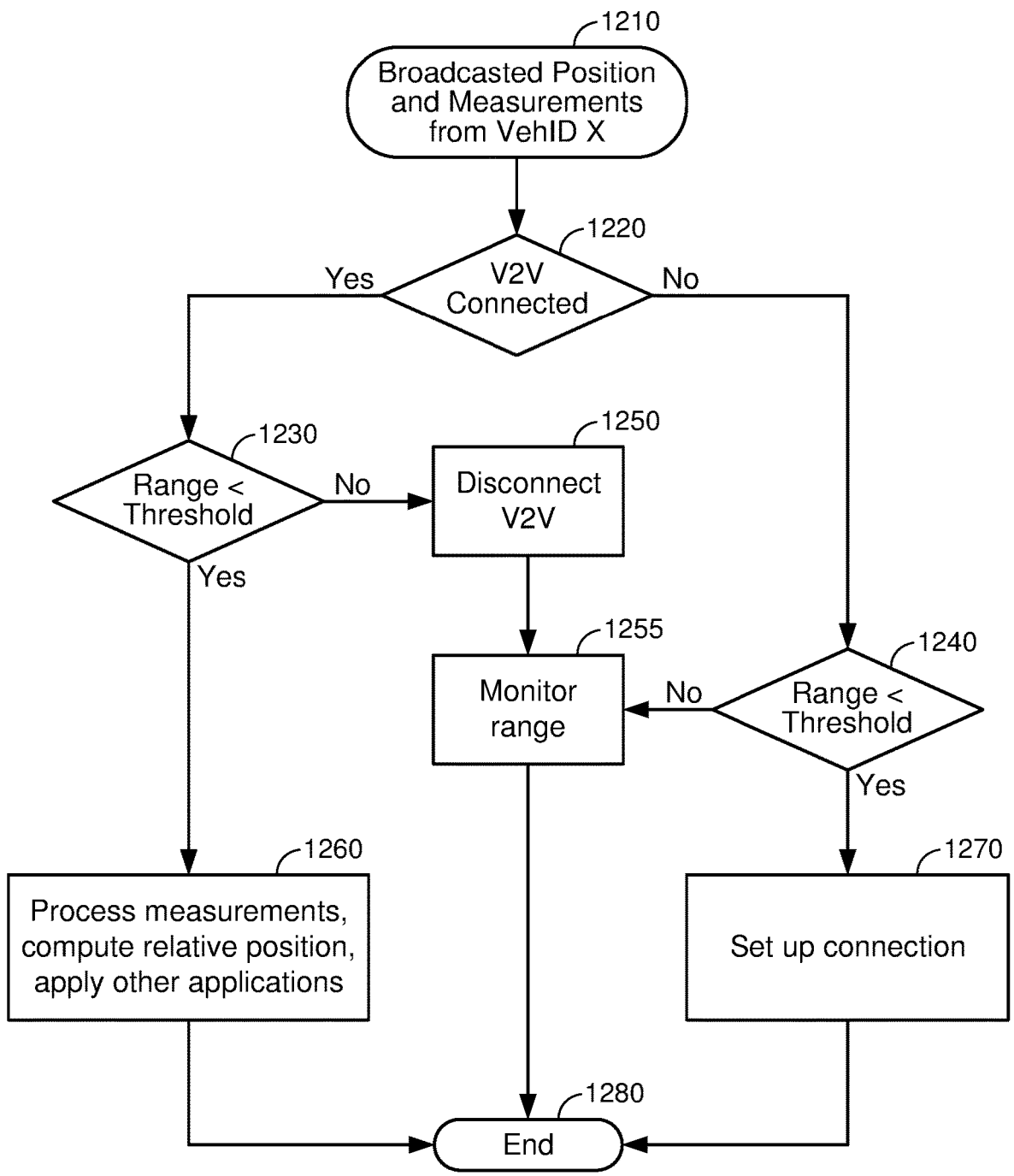
FIG. 12 illustrates a sample embodiment of a process for a hybrid system for determining relative position that utilizes both broadcast information and V2V-based information.

FIG. 12 illustrates an exemplary embodiment of a decision tree for an embodiment where relative position is determined in a mixed mode where all cars exchange (for example, via broadcast) VID (user and/or vehicle identification information) and position information but where GNSS measurement information and/or other location measurement information is exchanged and/or processed based on distance criteria. The various vehicles broadcast Vehicle ID information and location information. In step 1210, the vehicle receives broadcast position and measurement information from other vehicles. In step 1220, the vehicle determines if an existing vehicle to vehicle (V2V) connection may have already been established, for example, a connection to a vehicle where the distance was less than a threshold. If the V2V connection is already established, and if range is less than a threshold range, in block 1230, than GNSS measurement information and/or other position related measurement information may be requested and processed in block 1260. In block 1260, in an embodiment, relative positions may also trigger other applications and/or actions by the vehicle such as to realign the spacing between the cars in back, in front or on either side of the vehicle. If the vehicle is not already connected, in decision block 1220, and range is less than a threshold range, in block 1240, a connection may be set up to request GNSS measurement information and/or other location measurement information, as may be received in block 1210. Also, if range is greater than a threshold in 1230, the V2V connection may be disconnected. In block 1255, the range of broadcasting vehicles where range is not less than the threshold range (or ranges) may be monitored such that, if range falls below a threshold in block 1240, a new V2V connection may be established in block 1270. It is understood that in some embodiments, there may be multiple threshold ranges, for example, as discussed previously, where GNSS measurement information from vehicles in different threshold bands is processed at different rates. In a multiple threshold range embodiment, the largest threshold may be used to determine if a connection should be made and/or if GNSS and/or other location measurement information should be processed. It is understood that, in block 1260, in some embodiments, where there are multiple threshold ranges, for example, as discussed previously, that the rate that GNSS and other location measurement information may be processed may be determined by the threshold band that the vehicle is within.

Figure 13:
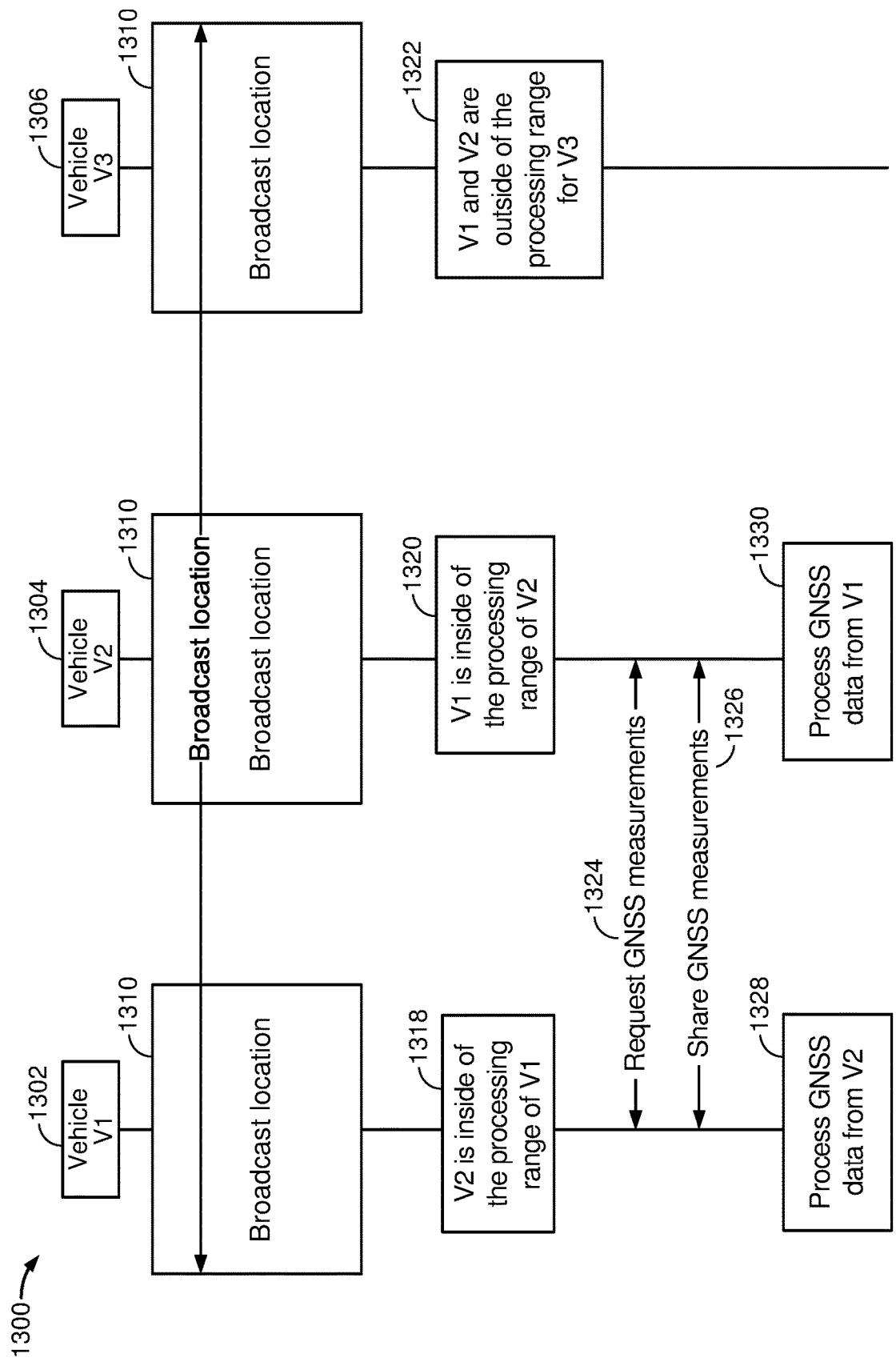
FIG. 13 illustrates messaging for a hybrid system for determining relative position.

FIG. 13 illustrates a messaging diagram for a mixed embodiment where vehicle and/or device ID is broadcast along with position information and GNSS measurement information and other position related measurement information is exchanged between vehicles to determine an accurate relative location between vehicles. In step 1310, vehicle 1 (V1) 1302, vehicle 2 (V2) 1304 and vehicle 3 (V3) 1306 broadcast a vehicle identifier and their respective locations. It is understood that in some embodiments, location accuracy/error information and/or confidence may also be broadcast to avoid vehicle collisions based upon high error locations. It is also understood that, in some vehicles, sensor systems such as LIDAR or camera-based systems my provide additional information to correct, corroborate or replace broadcast location information, to avoid collisions based on inaccurate broadcast location information and/or to prevent spoofing-based attempts to induce vehicular collisions. In steps 1318, 1320 and 1322, each vehicle decides which other vehicles are adjacent or otherwise within a processing range. Therefore, in step 2018, V1 1302 monitors the location of V2 1304, as being within V1's processing range. In step 1320, V2 1304 monitors the location of V1 1302 as being within V2's processing range. Similarly, in step 1322, based at least in part on received broadest information from V1 1302 and V2 1304, V3 1306 determines that V1 1302 and V2 1304 are outside of its processing range and do not need to be monitored. In step 1324, V1 and V2 send requests, to each other, for GNSS measurement data and/or other position location measurement data and in step 1326, V1 1302 and V2 1304 share location measurement information including GNSS measurement information between each other. In steps 1328 and 1330 vehicle V1 1302 and vehicle V2 1304 process GNSS measurement data and/or other location measurement data from each other respectively and use the measurement data to determine a relative location for the other vehicle V1 1302 and/or vehicle V2 1304. Thus, vehicle V1 1302 may calculate a relative location, using the GNSS measurement data and/or other location measurement data from vehicle V2 1304 to determine a relative location of vehicle V2 1304 and vehicle V2 1304 may calculate a relative location of vehicle V1 1302, using the GNSS measurement data and/or other location measurement data from vehicle V1 1302. In an embodiment, the relative location may be utilized to trigger or support and action or application, such as an action to adjust the inter-vehicular spacing, here, for example, between V1 1302 and V2 1304.

Figure 14:
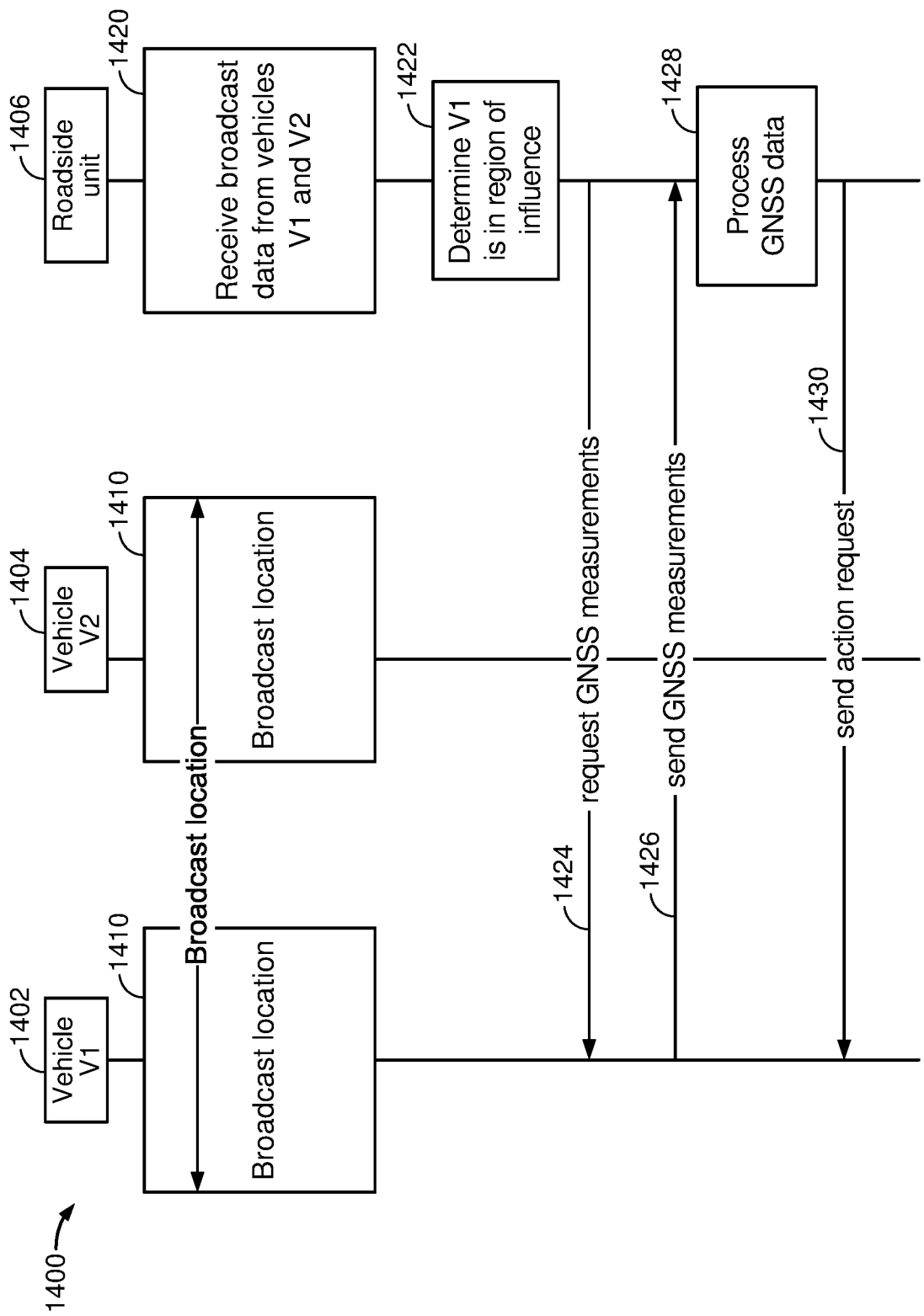
FIG. 14 illustrates messaging for a system that interacts with a roadside unit which performs traffic control and/or intersection control

FIG. 14 illustrates a messaging diagram for an embodiment where broadcast location is utilized in an interaction with a roadside unit (RSU) that controls access to an area such as passing through an intersection. In step 1410 both vehicle V1 1402 and vehicle V2 1404 broadcast a vehicle ID and a location of the respective vehicle. In some embodiments GNSS measurement information and other position related measurement information is also broadcast, in which case steps 1424 and 1426 to request and receive GNSS measurement information and other location measurement information may be unnecessary and, in an embodiment, not performed. In step 1420, roadside unit 1406 monitors broadcast information from vehicles with communication range and/or within other threshold range such as a predesignated distance or region of control. In a non-broadcast embodiment, messaging may be sent, from vehicles entering a region of influence for a roadside unit, to the roadside unit 1406 notifying the RU 1406 of their presence. In a server-coordinated embodiment, messaging may be coordinated through a server which will notify or otherwise cause vehicles entering a region of influence for a roadside unit to share location and GNSS measurement data with the RU

1406. In a map-coordinated embodiment, regions of influence for RU(s) 1406 may be designated on a map as meta data associated with the region. Entering a region of influence may cause vehicles to share location and GNSS measurement data with the RU 1406 for that region of influence. In step 1422, based upon location information for and typically provided by V1 1402, for example, such as vehicle ID and location from step 1410 or as otherwise sent from V1 1402, roadside unit 1406 determines that V1 1402 is in or, in an embodiment, approaching a region of control. Similarly, while not illustrated in FIG. 14 (the assumption being that vehicle V2 1404 may be outside of broadcast range for the scenario illustrated in FIG. 14), in step 1422, if messaging is received from V2 1404 including location and vehicle identification, whether received as a broadcast message or a direct message from V2 1404, roadside unit 1406 will similarly determine if V2 1404 is in a region of influence. In various embodiments, step 1410 messaging including location and vehicle identification may be sent directly to the roadside unit, instead of or in additional to being broadcast. In step 1424, roadside unit 1406 requests (in response to a determination that V1 is in or approaching a region of control or influence), requests GNSS measurement information and/or other positioning measurement information from V1 1402. The roadside unit 1406 will similarly request GNSS measurement data and/or other location measurement data from vehicles determined to be in the region of influence for roadside unit 1406. Note, in some embodiments, particularly in embodiments where a vehicle is aware that it is entering a region of influence for a roadside unit, the vehicle may automatically send GNSS measurement data and/or other location measurement data without requiring the roadside unit 1406 to send a request (i.e., step 1424, and potentially also step 1422, may be optional in some embodiments where the vehicle determines whether it is in a region of influence or not and initiates communication with the roadside unit). In step 1426, vehicle V1 1402 responds, sending GNSS measurement information and/or other position measurement information to roadside unit 1406, which, in step 1428, processes the received GNSS data and/or other position-related measurement data and determines a relative location of vehicle V1 1402. The relative locations of vehicles in the region of influence may be utilized by the roadside unit to influence and/or control vehicles within the region of influence, for example, by sending driving instructions and/or access permissions to the vehicles such as access to intersections or lanes, requests that a vehicle change speed or travel at a particular speed, requests that a vehicle change lanes or drive in a particular lane, requests that a vehicle change directions, turn or stop or other operational instructions and/or requests. Based on the determined relative location of vehicle V1 1402, and in some embodiments, movement information for vehicle V1 1402 such as direction, heading, and velocity, the roadside unit 1406 determines and sends an action related request, access grant, access denial and/or or other instructions to vehicle V1 1402. For example, the action request or instructions may comprise a grant or refusal of access to an intersection, instructions to stop, start, speed up or slow down, instructions to change lanes and/or instructions to change lanes or other vehicular actions for vehicle V1 1402.

Figure 15:
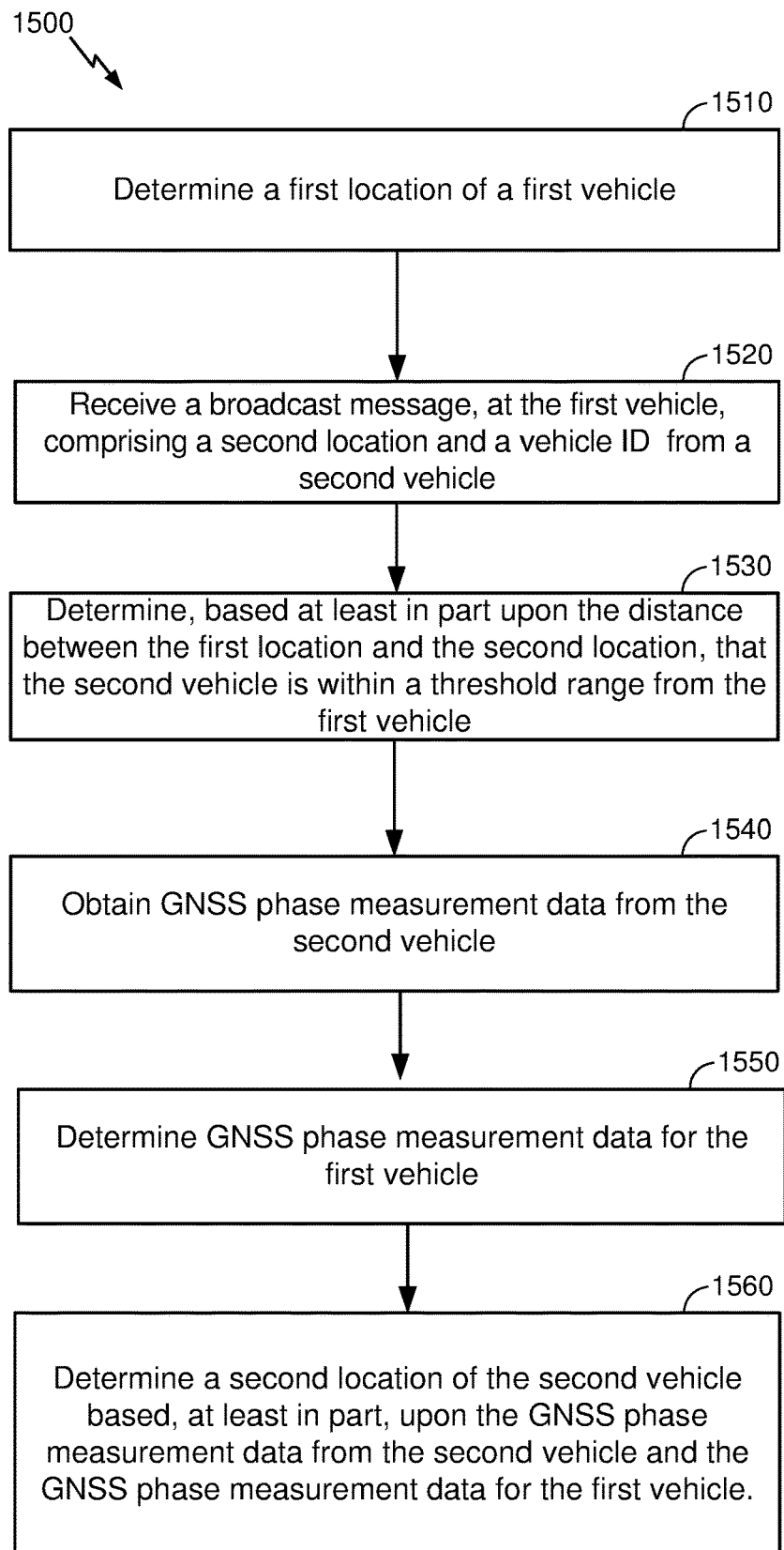
FIG. 15 illustrates a sample embodiment of a process for determining relative location between vehicles.

FIG. 15 illustrates an embodiment for determining relative position of vehicles within processing range. In step 1510, the vehicle sends one or more broadcast messages, whereby it broadcasts its location and a vehicle identification (ID). In an embodiment, other information may also be broadcast, for example, an error estimate associated with the location, such as may be determined using a least squares fit of the measurement information (such as GNSS pseudoranges and/or various sensor data), a time stamp associated with the location (for example a GNSS time associated with the location determination), and/or an uncertainty associated with the location. In some embodiments, the location may be considered current, and time information may be unnecessary. In step 1520, the vehicle receives broadcast location information and vehicle ID from a plurality of vehicles. In an alternative embodiment, the vehicle may receive location and ID of adjacent and/or nearby vehicles from a server. In step 1530, the vehicle uses the received locations and the location of the vehicle and determines which transmitting vehicles are inside of a threshold range from the vehicle. In an embodiment, the range may be determined using a simple distance formula, where point one is represented by coordinates $X_1$, $Y_1$ and point two is represented by coordinates $X_2$, $Y_2$ and the distance between the two points may be represented by $[(X_2-X_1)^2+(Y_2-Y_1)^2]^{1/2}$.

In step 1540, the vehicle may request and receive GNSS measurement data and/or other location measurement data from vehicles within the threshold range(s). In various embodiments, there may be multiple threshold ranges, each corresponding to a different relative location determination rate. For example, within a first threshold, $T_1$, GNSS measurements and other location related data may be requested at a first rate, $R_1$. Between the first threshold $T_1$ and a second threshold $T_2$, GNSS measurements and other location related data may be requested at a second rate. Outside of the second threshold $T_2$, GNSS measurements and other location related data may be requested at a third rate, $R_3$, or not at all. The rates of requests for GNSS measurement data and/or other location measurement data, in an embodiment, may decrease as the vehicle distance from central vehicle increases, such that $R_1 > R_2 > R_3$. It is also understood that, in various embodiment, the threshold regions may be of various shapes; for example, as shown in FIG. 11, interior region is rectangular and the external region oval. Similarly, a region may follow a lane or set of lanes or be located around an intersection. Also, in some embodiments, the GNSS measurement data and/or other location measurement data may be sent by surrounding vehicles to the vehicle automatically. For example, if a vehicle determines it is within a threshold range of another vehicle it may automatically start sending ongoing measurements of GNSS measurement data and/or other location measurement data to the other vehicle, and vice versa. I.e., the exchange of GNSS measurement data and/or other location measurement data may be automatically triggered by each vehicle to provide data to the other vehicle. In an embodiment, if other vehicles are within threshold range, it may be used to trigger ongoing broadcasts of GNSS measurement data and/or other location measurement data, which would have the advantage of reducing or eliminating request messaging overhead.

In step 1550, the vehicle may determine a relative location of the at least one vehicle within a threshold range based, at least in part, upon the GNSS measurement data. In an embodiment, the vehicle may determine a relative location of all vehicles within a threshold range or, based on the received location(s) and vehicle identification(s), the vehicle may process the GNSS measurement data and/or other location measurement data only for vehicles that are directly adjacent to it, or based on the received location(s) and vehicle identification(s), the vehicle may process the GNSS measurement data and/or other location measurement data only for vehicles that have above a threshold likeliness of collision or interaction, or based on the received location(s)

and vehicle identification(s), the vehicle may process the GNSS measurement data and/or other location measurement data only for vehicles that are approaching in opposing or crossing lanes, vehicles in front, vehicles in back and/or vehicles to either side or various combinations thereof) or based on the received location(s) and vehicle identification(s), the vehicle may process the GNSS measurement data and/or other location measurement data only for vehicles for which requests and/or interactions will be made (for example, to adjust spacing between the requesting and receiving vehicle or to request space for a lane change or merge).

In an embodiment, the relative location of adjacent vehicles may be utilized to trigger and/or inform interactions with adjacent vehicles or other vehicles which may interact with the vehicle. For example, vehicles that are approaching in opposing or crossing lanes, vehicles in front, vehicles in back and/or vehicles to either side are likely to interact with the vehicle. For example, the vehicle may request that vehicles in an adjacent lane create a space for the vehicle to merge into. For example, the vehicle may request that vehicles in front of it and/or in back of it adjust spacing between the vehicle and the vehicles in front of it and/or in back of it. For example, the vehicle may inform the vehicle in back of it of an upcoming stop, slowdown or lane change. For example, the vehicle may inform the vehicle in back of it of an upcoming road hazard. In an embodiment, the vehicle may send instructions or requests for adjustments in spacing, lane changes and emergency maneuvers to the vehicles around it. The vehicle may also use the determined relative position to inform how it reacts to requests and notifications from neighboring vehicles as well.

Figure 16:
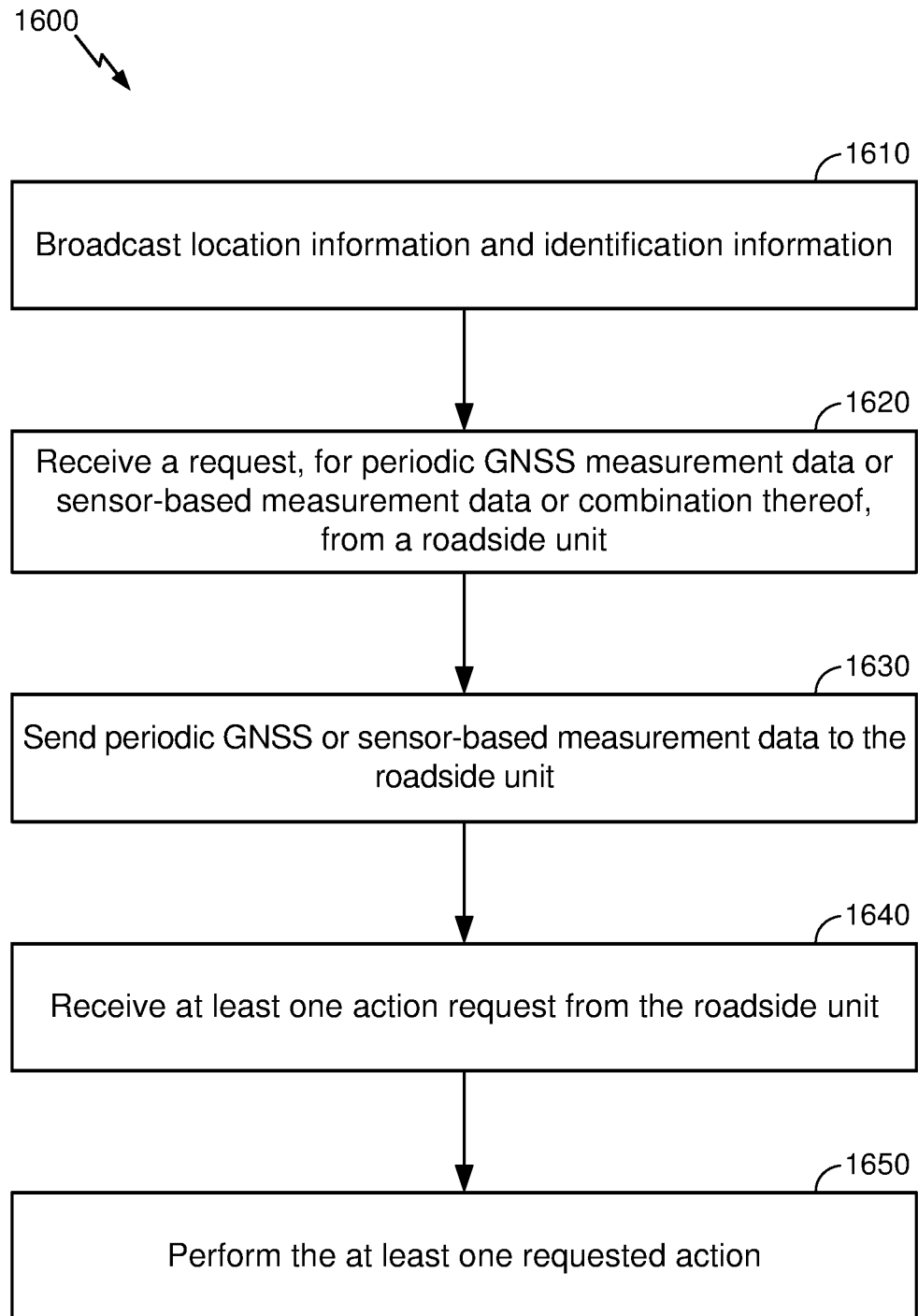
FIG. 16 illustrates a sample embodiment of a process for using relative location in an interaction with a roadside unit

In FIG. 16, illustrates an embodiment for a vehicle interacting with a roadside unit within the region of influence of the roadside unit. In step 1610, the vehicle or other mobile device broadcasts location information and identification information. It is understood that, in similar embodiments, a mobile phone or other pedestrian device may similarly broadcast or otherwise send location information and identification information and that the embodiments described below may also be implemented in mobile phones and/or other pedestrian devices. In various embodiments, the vehicle may also send location information and identification directly to the roadside unit, rather than broadcast it. In a vehicle to roadside direct send scenario, the vehicle may be triggered to send the location information and vehicle ID based on a variety of triggers; for example, entering a region of influence, as may be determined by metadata and/or a marked region on a map, or, for example, upon request from a roadside unit; or for example, upon request from a server that monitors the location of vehicles relative to roadside unit regions of influence; or upon detection of a broadcast signal by a roadside unit (for example, a broadcast signal, from a roadside unit, announcing a roadside unit that controls intersection access).

A roadside unit, in an embodiment, may broadcast or otherwise send its location and identification. The roadside unit may also send a request for location information to mobiles within transmission range. The location information requested may include latitude and longitude, phase offset, heading, velocity, ability to stop or otherwise maneuver relative to an intersection or a pedestrian, or other location related information. A roadside unit may also provide positioning information, absolute or relative to the roadside unit, for vehicles and pedestrians with a zone of influence for the roadside unit. For example, a roadside unit may determine or update the location of cars and pedestrians that are located within a zone of influence (such as within a particular radius of the roadside unit or within a particular distance from an intersection or within a particular distance of a crosswalk). This is particularly useful in tracking the movements of pedestrians and vehicles that are not advertising their location. The location of pedestrians and/or vehicles may be determined and/or verified using their broadcast location, if available, and sensor data, such as cameras, RADAR, SONAR, LIDAR, infrared or other light-based ranging systems, road-based magnetic sensors and/or other sensor inputs capable of determining the location of objects in the zone of influence. A roadside unit may also be capable of actively querying vehicles and/or pedestrian devices such as smartphones for location information which may include absolute information such as latitude and longitude or relative location information such as distance and heading or GNSS or other measurement information such as phase offset measurements.

In step 1620, the vehicle may receive a request, for periodic GNSS measurement data and/or sensor-based measurement data, from a roadside unit. Measurement data may include calculated latitude, longitude, heading and/or velocity or may include raw measurement data such as pseudorange measurements and/or phase offset data for various satellite vehicles or various combinations thereof. Measurement data may also sensor measurement data such as vehicular acceleration and vehicular and/or wheel rotational information. In an embodiment, wheel rotational data may be utilized by a roadside unit to determine road surface conditions. It is understood that in various embodiments, sets of GNSS measurement data and/or other location measurement data may be requested and sent individually; or, in an embodiment, a roadside unit may send (and vehicles and/or pedestrian devices respond to) a request to vehicles and/or other devices in or close to a region of influence to turn on/broadcast GNSS measurement data and/or other location measurement data on a continuous basis. A roadside unit may also request a repeating request for GNSS information from a vehicle or pedestrian device that may be sent point to point directly to the roadside unit from the vehicle or pedestrian device. The requested data may, in some embodiments, vary from request to request. For example, in some embodiments, the initial request may include a request for absolute location such as latitude and longitude while subsequent requests may only request phase offset information or pseudorange information or relative location information or various combinations thereof; similarly, a vehicle or pedestrian device, in response to a request from the roadside unit may, in some embodiments, include an absolute location such as latitude and longitude and subsequent responses may provide phase offset information or pseudorange information or relative location information or various combinations thereof with or without absolute location information.

In an embodiment, a request for GNSS measurement data and/or other location measurement data from a roadside unit to a vehicle or pedestrian device may specify that GNSS measurement data and/or other location measurement data be sent for a designated period of time or that it be sent within particular geographic boundaries. In an embodiment, a request for GNSS measurement data and/or other location measurement data from a roadside unit to a vehicle and/or pedestrian device may specify that GNSS measurement data and/or other location measurement data be sent at a specified time interval/rate and the time intervals/rates may be fixed or may vary, for example, with distance or location relative to the roadside unit or direction/heading relative to the roadside unit or to other geographical point of reference.

In an embodiment, a request for location information, for example, periodic GNSS measurement data or absolute location information, may also be accompanied by location information for vehicles and/or pedestrian devices (such as mobile devices) within the region of influence of a roadside unit. In an embodiment, a roadside unit may provide information on vehicles and/or pedestrian devices, within the region of influence, to the vehicle or other mobile device, either as part of a request for information, or on a repetitive basis or combination thereof. The location information for vehicles and/or pedestrian devices, within the region of influence, may be unsolicited. The location information for vehicles and/or pedestrian devices, within the region of influence, may be limited to information regarding vehicles and/or pedestrian devices, within the region of influence, that are close to or that may intersect a direction of travel for the vehicle or other mobile device. In some embodiments, the location information for vehicles and/or pedestrian devices, within the region of influence, may be broadcast by a roadside unit and received by vehicles and/or pedestrian devices, within the region of influence. In some embodiments, the location information sent by the roadside unit and received by vehicles and/or mobile devices may be limited to information for vehicles and/or mobile devices and/or objects and/or pedestrians that do not broadcast or otherwise self-advertise their location; for example, so that a vehicle may be made aware of the location of pedestrians and/or animals and/or obstacles regardless of whether they are capable of and/or are currently sending and/or broadcasting their current location. Thus, a vehicle may receive the location of pedestrians and pets or other animals that are within the region of influence and/or are likely to impact the transit of the vehicle and may utilize the location information provided by roadside units to determine maneuvering and transit control of the vehicle. For example, a vehicle may determine that it should stop for a pedestrian, based on the pedestrian's direction of travel and location as provided by or supplemented by a roadside unit. This may be particularly useful for pedestrians, bicycles, pets, etc. that may not be detected by a vehicle due to darkness, blockage by fixed objects such as buildings, fences, bushes and/or shrubbery, lack of visual/camera contrast, or other detection failure scenarios.

In step 1630, the vehicle sends periodic GNSS measurement data and/or sensor-based measurement data and/or other location measurement data to the roadside unit. It is understood that in various embodiments, each set of GNSS measurement data and/or other location measurement data may be requested and sent individually; or, in an embodiment, a roadside unit may send a request to vehicles in or close to a region of influence where the vehicle turns on/broadcast GNSS measurement data and/or other location measurement data on a continuous basis. In an embodiment, GNSS measurement data and/or other location measurement data may be sent to a roadside unit for a designated period of time or it may be sent within particular geographic boundaries. In an embodiment, GNSS measurement data and/or other location measurement data may be sent at a particular time intervals or rates and the time intervals or rates may be fixed or may vary, for example, with distance or location relative to the roadside unit or direction/heading relative to the roadside unit or to other geographical point of reference. GNSS measurement data may include, in various embodiments, absolution location or phase offset data for GNSS satellite or other signals or may include pseudorange measurements for GNSS satellite or other signals. Signals sources may include satellite signals, communication transceivers, and/or beacon signals and/or signals from the roadside unit itself. Signal measurement data may also comprise, in some embodiments, round trip time measurements and/or angle of arrival measurements, particularly of signals being sent by terrestrial signal sources.

In step 1640, vehicle receives at least one action request sent by the roadside unit. For example, the vehicle may receive instructions or requests roadside unit to influence and/or control its actions and movement within the region of influence. In an embodiment, the vehicle may receive driving instructions and/or access permissions such as permission to access an intersections or lanes, or a request to change speed or to travel at a particular speed, or a request to change lanes or to drive in a particular lane, or a request to change directions, turn or stop or a request for other operations. In an embodiment, a requested action may be associated with one or more coordinates such as a location to stop at and/or with distance and/or measurements and/or number of lanes to move and a vector or direction of movement or lane change (left or right or an angle, for example). In an embodiment, a stopping location may be absolute such as specified by a latitude and longitude (or other location designation or marking) or a stopping location may be relative to another vehicle, person, mobile device, stationary device and/or object. In an embodiment, the vehicle may receive action requests to coordinate lane changes, stopping, starting and other actions directly with other vehicles and/or devices may receive the identification of other vehicles and/or other devices, such as mobile phones or Internet of things devices, with which to coordinate movement with, such that traffic flow safety is maintained and/or optimized and/or pedestrians are able to safely cross an area of transit regardless of the presence or absence of a crosswalk or of an indicator light. The coordination may be determined by the roadside device or may be determined by the individual devices or may be a combination of both, where some actions are delegated by the roadside unit to the vehicles and/or other mobile devices. In an embodiment, the at least one action request may be acknowledged to the roadside unit, where an acknowledgment may include whether the vehicle or other mobile device will and/or is able to comply with the action request or if a roadside unit should request actions from other vehicles and/or pedestrian/mobile devices to compensate for a vehicle or other devices inability to comply with an action request. For example, a truck moving at speed may not be able to stop prior to an intersection, and may issue a non-compliance response to the at least one action request, forcing the roadside unit to instruct cross traffic to stop instead, if possible, or to instruct avoidance maneuvers by vehicles and/or devices that are likely to otherwise collide or otherwise interact unsafely with the truck or other vehicle that issued the non-compliance response. A vehicle or other device may also determine that it can comply and may issue a compliance response. In an embodiment, a vehicle which may otherwise be able to comply with the roadside unit may, for example, for reasons of priority or time critical transit, such as for an emergency vehicle (ambulance, fire or other emergency vehicle) or for a person needing urgent transit to a hospital or other urgent destination, issue a request to not comply with the action request and await permission to not comply from the roadside unit. The roadside unit may send alternative action requests determine to other vehicles requesting a change of action or a withdrawal of permission (such as permission to transit an intersection), in response to requested and/or likely non-compliance by another vehicle or vehicles.

In step 1650, the vehicle may perform at least one requested action such as, but not limited to those described in step 1640. For example, the vehicle may stop or access an intersection or start movement in a particular direction or speed up or slow down or change lanes or change lanes or initiate coordination with other vehicles to change lanes or transit an intersection or take other vehicular actions. In an embodiment, in the response to the action request, the vehicle (or other device) may interact with and/or coordinate with other nearby vehicles and/or devices, for example, to coordinate to provide space in a lane for a requested lane change. In an embodiment, a mobile phone, acting as a pedestrian device, may issue an audible request to a pedestrian to take a particular action such as to stop or to cross a street or to remain on the side walk or to back away from the street; such a request may be in response to avoiding oncoming traffic or to crossing a street safely or to provide additional buffer street from a street, for example, to avoid splash from a puddle or to provide added safety buffer from out of control vehicles in slippery road conditions. In an embodiment, the vehicle or other mobile device, pedestrian device and/or device may also provide a status response to the roadside unit during the requested action or after the requested action is completed.

FIG. 17 illustrates three vectors between three vehicles wherein the three vectors may be used to mathematically constrain the solutions for the location of the three vehicles. As discussed above, using three GNSS receivers, we can determine three baselines between any two receivers, i.e., $\Delta\nabla\phi_{1,2}{}^{i,j}$, $\Delta\nabla\phi_{1,3}{}^{i,j}$, $\Delta\nabla\phi_{2,3}{}^{i,j}$, and hence, three corresponding double difference ambiguities. The ambiguity constrained according to the following, $\Delta\nabla N_{1,2}{}^{i,j} + \Delta\nabla N_{2,3}{}^{i,j} = \Delta\nabla N_{1,3}{}^{i,j}$, which may be utilized for integer ambiguity resolution thereby reducing the time of resolution and increasing reliability. Similarly, if the measurements from the three GNSS receivers are processed together, we can form three position vectors between the three receivers (1, 2, and 3), $\vec{P}_{1,2}$, $\vec{P}_{2,3}$, $\vec{P}_{1,3}$, where $\vec{P}_{1,2} + \vec{P}_{2,3} = \vec{P}_{1,3}$. This vector relationship is clearly illustrated in FIG. 17. The position vector constraint may be used to accelerate baseline and/or ambiguity resolution and to improve reliability.

It is understood that various embodiments may be utilized to implement the processes and methods disclosed above and that the processes and methods disclosed may be implemented using various means, which may comprise various combinations of hardware and software.

In various embodiments, and as discussed above, vehicle 100 may utilize location systems to determine location which may be communicated in location data elements to adjacent and/or nearby vehicles. Vehicle 100 may use location in determining vehicular motion, for example, when merging lanes or in determining spacing between vehicles. Vehicle 100 may exchange location information with adjacent or nearby vehicles to negotiate and coordinate motion such as lane changes and in adjusting spacing between vehicles or setting vehicle velocity or target vehicle position.

In this document, it is understood that the terms ID and identification may be utilized interchangeably.

In various embodiments, and as discussed above, vehicle 100, e.g. vehicle A 480 and vehicle B 490, may have circuitry and processing resources capable of obtaining location related measurements (e.g. for signals received from GPS, GNSS or other Satellite Positioning System (SPS) satellites 410, WAN wireless transceiver 420 or WLAN or PAN local transceiver 430 and possibly computing a position fix or estimated location of vehicle 100 based on these location related measurements. In the presently illustrated example, location related measurements obtained by vehicle 100 may include measurements of signals (412) received from satellites belonging to an SPS or Global Navigation Satellite System (GNSS) (410) such as GPS, GLONASS, Galileo or Beidou and/or may include measurements of signals (such as 422 and/or 432) received from terrestrial transmitters fixed at known locations (e.g., such as WAN wireless transceiver 420). Vehicle 100 or a location server 460 may then obtain a location estimate for vehicle 100 based on these location related measurements using any one of several position methods such as, for example, GNSS, Assisted GNSS (A-GNSS), Advanced Forward Link Trilateration (AFLT), Observed Time Difference of Arrival (OTDOA) or Enhanced Cell ID (E-CID), network triangulation, Received Signal Strength Indication (RSSI) or combinations thereof. In some of these techniques (e.g. A-GNSS, AFLT and OTDOA, RSSI), pseudoranges, ranges or timing differences may be measured at vehicle 100 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at vehicle 100. Servers may provide positioning assistance data to vehicle 100 including, for example, information regarding signals to be measured (e.g., signal timing and/or signal strength), locations and identities of terrestrial transmitters, and/or signal, timing and orbital information for GNSS satellites to facilitate positioning techniques such as A-GNSS, AFLT, OTDOA and E-CID. For example, location server 460 may comprise an almanac which indicates locations and identities of wireless transceivers and/or local transceivers in a particular region or regions such as a particular venue and may provide information descriptive of signals transmitted by a cellular base station or AP or mobile terrestrial transceiver such as transmission power and signal timing. In the case of E-CID, a vehicle 100 may obtain measurements of signal strengths for signals received from WAN wireless transceiver 420 and/or wireless local area network (WLAN) or PAN local transceiver 430 and/or may obtain a round trip signal propagation time (RTT) between vehicle 100 and a WAN wireless transceiver 420 or wireless local transceiver 430. A vehicle 100 may use these measurements together with assistance data (e.g. terrestrial almanac data or GNSS satellite data such as GNSS Almanac and/or GNSS Ephemeris information) received from a location server 460 to determine a location for vehicle 100 or may transfer the measurements to a location server 460 to perform the same determination.

In various embodiments, location may be determined through various means, as described above. For example, in an embodiment, the vehicle 100 may determine its location with GNSS satellite signal measurements, with terrestrial transmitter signal measurements or some combination thereof. In an embodiment, vehicle 100 may determine its location with LIDAR, RADAR, GNSS, sensors and various combinations thereof. In an embodiment, the vehicle 100 may determine its location using accelerometers and/or gyros and various sensors (wheel ticks, steering direction, etc.) to determine, via dead reckoning, distance and direction traveled from the last determined position. In an embodiment, the vehicle 100 may determine its location using a combination of signals and sensors; for example, a location may be determined using various signal measurements from GNSS and terrestrial transmitters and then updated using dead reckoning. From a determined location, various signal measurements can be taken from visible transmitters to obtain an indication of distance of the transmitter from a determined location. The indication of distance may include signal strength or round-trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN wireless transceiver 420 or WLAN or PAN local transceiver 430, may be determined. The location of the transmitter may be determined on vehicle 100 or on a crowd sourcing server or on a location server 460 or other network-based server.

A vehicle (e.g. vehicle 100 in FIG. 2, e.g., vehicle A 480 and vehicle B 490) may be referred to as a device, a car, a truck, a motorcycle, a flying device such as a plane or drone, a wireless device, a mobile terminal, a terminal, a mobile station (MS), a user equipment (UE), a SUPL Enabled Terminal (SET). Typically, though not necessarily, a vehicle may support wireless communication such as using V2X, GSM, WCDMA, LTE, CDMA, HRPD, Wi-Fi, BT, WiMAX, Long Term Evolution (LTE), 5th Generation Wireless (5G) or new radio access technology (NR), V2X communication protocols, etc. A vehicle may also support wireless communication using a wireless LAN (WLAN), personal area network (PAN) such as Bluetooth or ZigBee, DSL or packet cable for example. In an embodiment, a vehicle may support transmission of basic safety messages (BSM) including various data elements, such as one delineating that the respective vehicle is autonomously driven In an embodiment, a vehicle may support transmission of ETSI cooperative awareness messages (CAM), for example, in an embodiment including various data elements such as a data element delineating that the respective vehicle is autonomously driven.

An estimate of a location of a vehicle (e.g., vehicle 100) may be referred to as a location, location estimate, location fix, fix, position, position estimate or position fix, and may be geographic, thus providing location coordinates for the vehicle (e.g., latitude and longitude) which may or may not include an altitude component (e.g., height above sea level, height above or depth below ground level, floor level or basement level). Alternatively, a location of a vehicle may be expressed as a civic location (e.g., as a postal address or the designation of some point or small area in a building such as a particular room or floor). A location of a vehicle may also be expressed as an area or volume (defined either geographically or in civic form) within which the vehicle is expected to be located with some probability or confidence level (e.g., 67% or 95%). A location of a vehicle may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. Also, references to carrier phase, to GNSS carrier phase and/or to GNSS phase measurements may, in various embodiments, may apply to GNSS carrier phase and GNSS carrier phase measurements. However, these techniques may, in an embodiment, also be applied to other signal sources, such as terrestrial base stations and access points. Furthermore, in various embodiments, other phase differences such as code phase differences may be utilized either in the alternative or in the combination with carrier phase. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, steps, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home or vehicle. In such an implementation, one or more vehicles may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Galileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of updating a location of target vehicles using GNSS phase measurement data, comprising:
   determining a location of an ego vehicle;
   receiving, at the ego vehicle from a first proximate vehicle, a broadcast message comprising a first location of the first proximate vehicle and a vehicle ID of the first proximate vehicle;
   determining, based at least in part upon a distance between the location of the ego vehicle and the first location of the first proximate vehicle, that the first proximate vehicle is within a threshold range from the ego vehicle;
   obtaining GNSS phase measurement data for the first proximate vehicle;
   determining GNSS phase measurement data for the ego vehicle;
   determining a second location of the first proximate vehicle based, at least in part, upon the GNSS phase measurement data for the first proximate vehicle and the GNSS phase measurement data for the ego vehicle.

2. The method of claim 1, wherein the second location of the first proximate vehicle comprises a location of the first proximate vehicle relative to the ego vehicle.

3. The method of claim 1, wherein the second location of the first proximate vehicle comprises an absolute location of the first proximate vehicle.

4. The method of claim 1, wherein the broadcast message is a basic safety message (BSM) or a Cooperative Awareness Message (CAM).

5. The method of claim 1, further comprising requesting, by the ego vehicle, the GNSS phase measurement data from the first proximate vehicle.

6. The method of claim 5, wherein requesting, by the ego vehicle, the GNSS phase measurement data from the first proximate vehicle comprises requesting that the first proximate vehicle send the GNSS phase measurement data periodically.

7. The method of claim 5, further comprising requesting, by the ego vehicle, time of measurement for the GNSS phase measurement data from the first proximate vehicle.

8. The method of claim 1, wherein the GNSS phase measurement data for the ego vehicle, the GNSS phase measurement data for the first proximate vehicle or combination thereof comprises GNSS phase measurements from multiple frequency bands.

9. The method of claim 1, wherein the GNSS phase measurement data for the ego vehicle, the GNSS phase measurement data for the first proximate vehicle or combination thereof comprises GNSS phase measurements for multiple GNSS satellite constellations.

10. The method of claim 1, wherein determining the second location of the first proximate vehicle based, at least in part, upon the GNSS phase measurement data from the first proximate vehicle and the GNSS phase measurement data for the ego vehicle comprises differencing carrier phase measurements taken at the ego vehicle with carrier phase measurements taken at the first proximate vehicle.

11. The method of claim 1, further comprising:
    obtaining GNSS phase measurement data from a second proximate vehicle;
    differencing carrier phase measurements taken at the ego vehicle with carrier phase measurements taken at the second proximate vehicle;
    differencing the carrier phase measurements taken at the first proximate vehicle with the carrier phase measurements taken at the second proximate vehicle; and
    updating the location of the second proximate vehicle.

12. A vehicle, comprising:
    a wireless transceiver;
    a GNSS receiver;
    a memory; and
    one or more processors, communicatively coupled to the wireless transceiver, the GNSS receiver and the memory;
    wherein the one or more processors are configured to:
    determine a location of an ego vehicle;
    receive a broadcast message, at the ego vehicle, comprising a first location of a first proximate vehicle and a vehicle ID of the first proximate vehicle from the first proximate vehicle;
    determine, based at least in part upon a distance between the location of the ego vehicle and the first location of the first proximate vehicle, that the first proximate vehicle is within a threshold range from the ego vehicle;
    obtain GNSS phase measurement data for the first proximate vehicle;
    determine GNSS phase measurement data for the ego vehicle;
    determine a second location of the first proximate vehicle based, at least in part, upon the GNSS phase measurement data for the first proximate vehicle and the GNSS phase measurement data for the ego vehicle.

13. The vehicle of claim 12, wherein the second location of the first proximate vehicle comprises a location of the first proximate vehicle relative to the ego vehicle.

14. The vehicle of claim 12, wherein the second location of the first proximate vehicle comprises an absolute location of the first proximate vehicle.

15. The vehicle of claim 12, wherein the broadcast message is a BSM message or a CAM message.

16. The vehicle of claim 12, wherein the one or more processors are further configured to request the GNSS phase measurement data from the first proximate vehicle.

17. The vehicle of claim 16, wherein the one or more processors configured to request the GNSS phase measurement data from the first proximate vehicle comprise one or more processors configured to request that the first proximate vehicle send the GNSS phase measurement data at recurring intervals periodically.

18. The vehicle of claim 16, wherein the one or more processors configured to request the GNSS phase measurement data from the first proximate vehicle are further configured to request time of measurement for the GNSS phase measurement data from the first proximate vehicle.

19. The vehicle of claim 12, wherein the GNSS phase measurement data for the ego vehicle, the GNSS phase measurement data for the first proximate vehicle or combination thereof comprises GNSS phase measurements from multiple frequency bands.

20. The vehicle of claim 12, wherein the GNSS phase measurement data for the ego vehicle, the GNSS phase measurement data for the first proximate vehicle or combination thereof comprises GNSS phase measurements for multiple GNSS satellite constellations.

21. The vehicle of claim 12, wherein the one or more processors configured to determine the second location of the first proximate vehicle based, at least in part, upon the GNSS phase measurement data from the first proximate vehicle and the GNSS phase measurement data for the ego vehicle comprise one or more processors configured to difference carrier phase measurements taken at the ego vehicle with carrier phase measurements taken at the first proximate vehicle.

22. The vehicle of claim 12, wherein the one or more processors are further configured to:
obtain, at the ego vehicle, a first location of a second proximate vehicle and a vehicle ID of the second proximate vehicle from the second proximate vehicle;
determine, based at least in part upon a distance between the location of the ego vehicle and the first location of the second proximate vehicle, that the second proximate vehicle is within the threshold range from the ego vehicle;
obtain GNSS phase measurement data from the second proximate vehicle;
difference carrier phase measurements taken at the ego vehicle with carrier phase measurements taken at the second proximate vehicle;
difference the carrier phase measurements taken at the first proximate vehicle with the carrier phase measurements taken at the second proximate vehicle; and
update the location of the second proximate vehicle.

23. A vehicle, comprising:
means for determining a location of an ego vehicle;
means for receiving a broadcast message, at the ego vehicle, comprising a first location of a first proximate vehicle and a vehicle ID of the first proximate vehicle from the first proximate vehicle;
means for determining, based at least in part upon a distance between the location of the ego vehicle and the first location of the first proximate vehicle, that the first proximate vehicle is within a threshold range from the ego vehicle;
means for obtaining GNSS phase measurement data for the first proximate vehicle;
means for determining GNSS phase measurement data for the ego vehicle;
means for determining a second location of the first proximate vehicle based, at least in part, upon the GNSS phase measurement data for the first proximate vehicle and the GNSS phase measurement data for the ego vehicle.

24. The vehicle of claim 23, wherein the second location of the first proximate vehicle comprises a location of the first proximate vehicle relative to the ego vehicle.

25. The vehicle of claim 23, wherein the second location of the first proximate vehicle comprises an absolute location of the first proximate vehicle.

26. The vehicle of claim 23, wherein the broadcast message is a BSM message or a CAM message.

27. The vehicle of claim 23, further comprising means for requesting, by the ego vehicle, the GNSS phase measurement data from the first proximate vehicle.

28. The vehicle of claim 27, wherein the means for requesting, by the ego vehicle, the GNSS phase measurement data from the first proximate vehicle comprises means for requesting that the first proximate vehicle send the GNSS phase measurement data periodically.

29. The vehicle of claim 27, further comprising:
means for obtaining, at the ego vehicle, a first location of a second proximate vehicle and a vehicle ID of the second proximate vehicle from the second proximate vehicle;
means for determining, based at least in part upon a distance between the location of the ego vehicle and the first location of the second proximate vehicle, that the second proximate vehicle is within the threshold range from the ego vehicle;
means for obtaining GNSS phase measurement data from the second proximate vehicle;
means for differencing carrier phase measurements taken at the ego vehicle with carrier phase measurements taken at the second proximate vehicle;
means for differencing the carrier phase measurements taken at the first proximate vehicle with the carrier phase measurements taken at the second proximate vehicle; and
means for updating the location of the second proximate vehicle.

30. A non-transitory computer-readable medium, having stored thereon computer-readable instructions to cause one or more processors on a vehicle to:
determine a location of an ego vehicle;
receive a broadcast message, at the ego vehicle, comprising a first location of a first proximate vehicle and a vehicle ID of the first proximate vehicle from the first proximate vehicle;
determine, based at least in part upon a distance between the location of the ego vehicle and the first location of the first proximate vehicle, that the first proximate vehicle is within a threshold range from the ego vehicle;
obtain GNSS phase measurement data for the first proximate vehicle;
determine GNSS phase measurement data for the ego vehicle;
determine a second location of the first proximate vehicle based, at least in part, upon the GNSS phase measurement data for the first proximate vehicle and the GNSS phase measurement data for the ego vehicle.

* * * * *